(12) United States Patent
Hirakawa et al.

(10) Patent No.: US 12,511,674 B2
(45) Date of Patent: Dec. 30, 2025

(54) INFORMATION PROCESSING APPARATUS, INFORMATION PROCESSING METHOD, AND NON-TRANSITORY COMPUTER-READABLE STORAGE MEDIUM

(71) Applicant: NEC Corporation, Tokyo (JP)

(72) Inventors: Yasufumi Hirakawa, Tokyo (JP); Nobuaki Kawase, Tokyo (JP); Takashi Yasuda, Tokyo (JP)

(73) Assignee: NEC CORPORATION, Tokyo (JP)

( * ) Notice: Subject to any disclaimer, the term of this patent is extended or adjusted under 35 U.S.C. 154(b) by 217 days.

(21) Appl. No.: 18/274,411

(22) PCT Filed: Jan. 13, 2022

(86) PCT No.: PCT/JP2022/000863
§ 371 (c)(1),
(2) Date: Jul. 26, 2023

(87) PCT Pub. No.: WO2022/254769
PCT Pub. Date: Dec. 8, 2022

(65) Prior Publication Data
US 2024/0095659 A1   Mar. 21, 2024

(30) Foreign Application Priority Data
May 31, 2021   (JP) ................. 2021-091801

(51) Int. Cl.
*G06Q 30/06* (2023.01)
*G06Q 10/0836* (2023.01)
(Continued)

(52) U.S. Cl.
CPC ..... *G06Q 30/0601* (2013.01); *G06Q 10/0836* (2013.01); *G06Q 30/0639* (2013.01); *H04W 4/02* (2013.01)

(58) Field of Classification Search
CPC .......... G06Q 30/0601; G06Q 10/0836; G06Q 30/0639; H04W 4/02
(Continued)

(56) References Cited

U.S. PATENT DOCUMENTS

2003/0040980 A1\* 2/2003 Nakajima ............... G07F 17/13
705/26.8
2007/0007331 A1   1/2007 Jasper et al.
(Continued)

FOREIGN PATENT DOCUMENTS

CN   112101873 A   12/2020
JP   2001-266019 A   9/2001
(Continued)

OTHER PUBLICATIONS

Y. Li et al. , "Study on Civil Aviation Airport Franchise Contract Based on Simulation Analysis," 2020 International Signal Processing, Communications and Engineering Management Conference (ISPCEM), Montreal, QC, Canada, 2020, pp. 18-25, retrieved from ip.com on Apr. 28, 2025 (Year: 2020).\*
(Continued)

*Primary Examiner* — Yogesh C Garg
(74) *Attorney, Agent, or Firm* — Sughrue Mion, PLLC

(57) ABSTRACT

An information processing apparatus (100) includes a position information acquisition unit (102) that acquires position information of a customer, and an order reception unit (104) that receives an order for product purchase by the customer at a virtual store, when the position information satisfies a criterion.

18 Claims, 27 Drawing Sheets

(51) Int. Cl.
   *G06Q 30/0601* (2023.01)
   *H04W 4/02* (2018.01)
(58) Field of Classification Search
   USPC .......................................................... 705/26.9
   See application file for complete search history.

(56) References Cited

U.S. PATENT DOCUMENTS

| | | | | |
|---|---|---|---|---|
| 2009/0281903 | A1* | 11/2009 | Blatstein | G06Q 50/12 705/26.1 |
| 2013/0138515 | A1 | 5/2013 | Taniguchi et al. | |
| 2014/0379607 | A1* | 12/2014 | Chousa | G06Q 10/0836 705/339 |

FOREIGN PATENT DOCUMENTS

| | | | | | |
|---|---|---|---|---|---|
| JP | 2002-074120 | A | | 3/2002 | |
| JP | 2002-174061 | A | | 6/2002 | |
| JP | 2002-269467 | A | | 9/2002 | |
| JP | 2009-535703 | A | | 10/2009 | |
| JP | 2011524561 | A | * | 9/2011 | ............... G07G 1/14 |
| JP | 2012-073380 | A | | 4/2012 | |
| JP | 2013-137755 | A | | 7/2013 | |
| JP | 2014-222436 | A | | 11/2014 | |
| JP | 2015-153194 | A | | 8/2015 | |
| JP | 2016-071741 | A | | 5/2016 | |
| JP | 2017076219 | A | * | 4/2017 | ............. G06Q 30/06 |
| JP | 2019191650 | A | * | 10/2019 | ............. G06Q 30/04 |
| WO | 2017/033291 | A1 | | 3/2017 | |

OTHER PUBLICATIONS

International Search Report for PCT Application No. PCT/JP2022/000863, mailed on Apr. 12, 2022.

* cited by examiner

FIG. 18

```
450 TAX EXEMPTION
    HISTORY INFORMATION
```

| CUSTOMER ID |
| --- |
| PASSPORT NUMBER |
| DATE OF PURCHASE |
| STORE ID OF STORE WHERE PURCHASED |
| INFORMATION ON PURCHASED PRODUCT (PRODUCT NAME, QUANTITY AND AMOUNT) |
| TOTAL AMOUNT PURCHASED |
| DATE OF TAX EXEMPTION PROCESSING |
| TAX EXEMPTION INFORMATION |
| TAXATION INFORMATION |

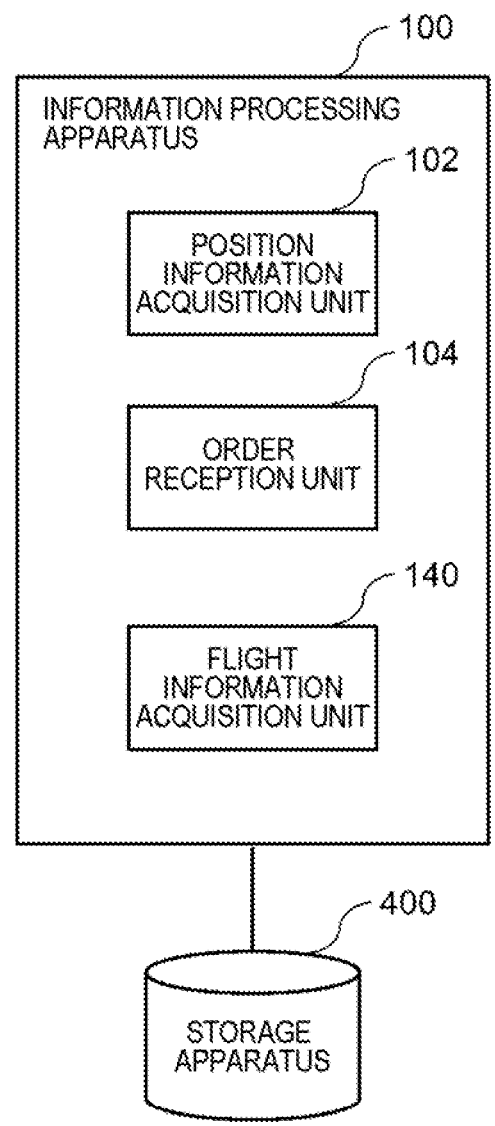

516 TICKET INFORMATION

470 FLIGHT TIME INFORMATION

FIG. 24
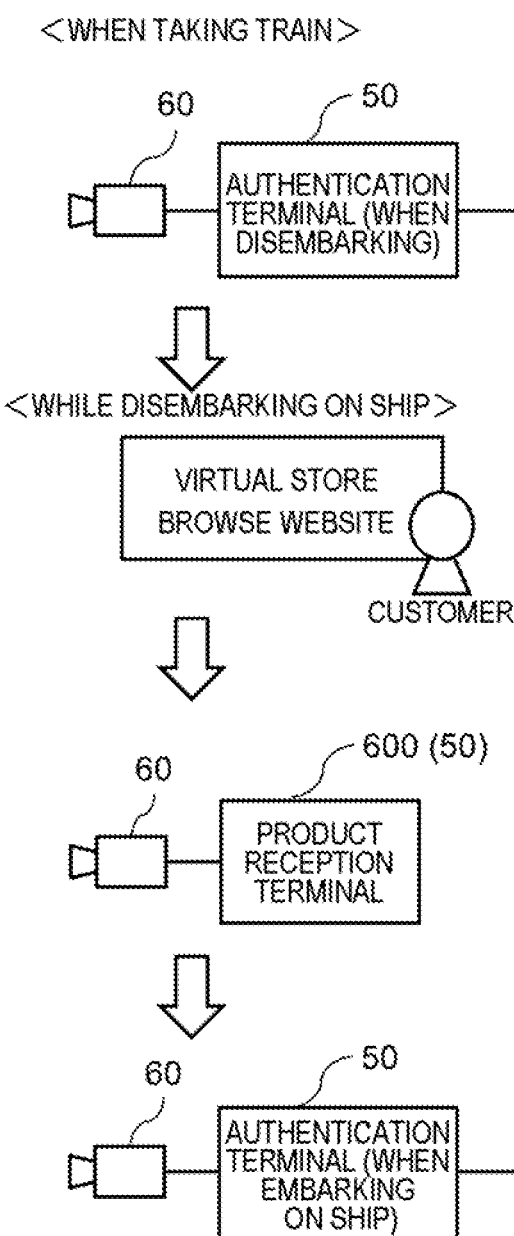
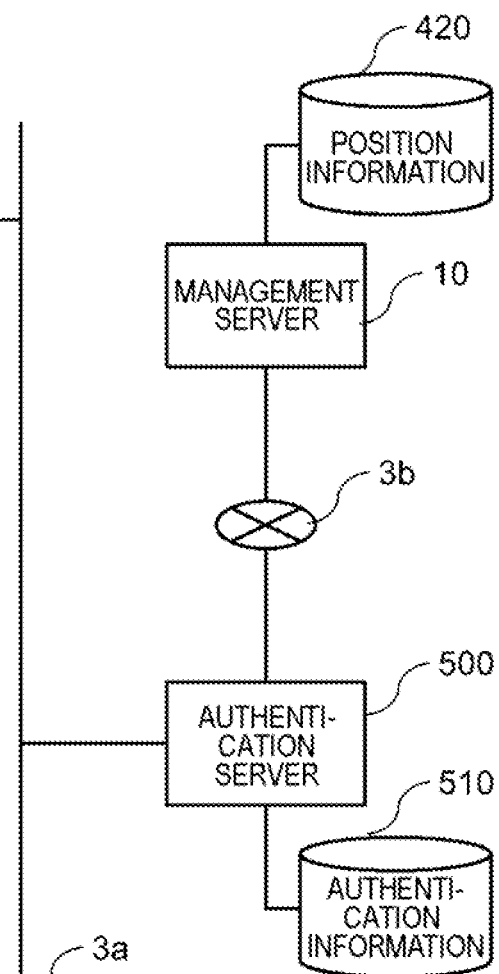

FIG. 26
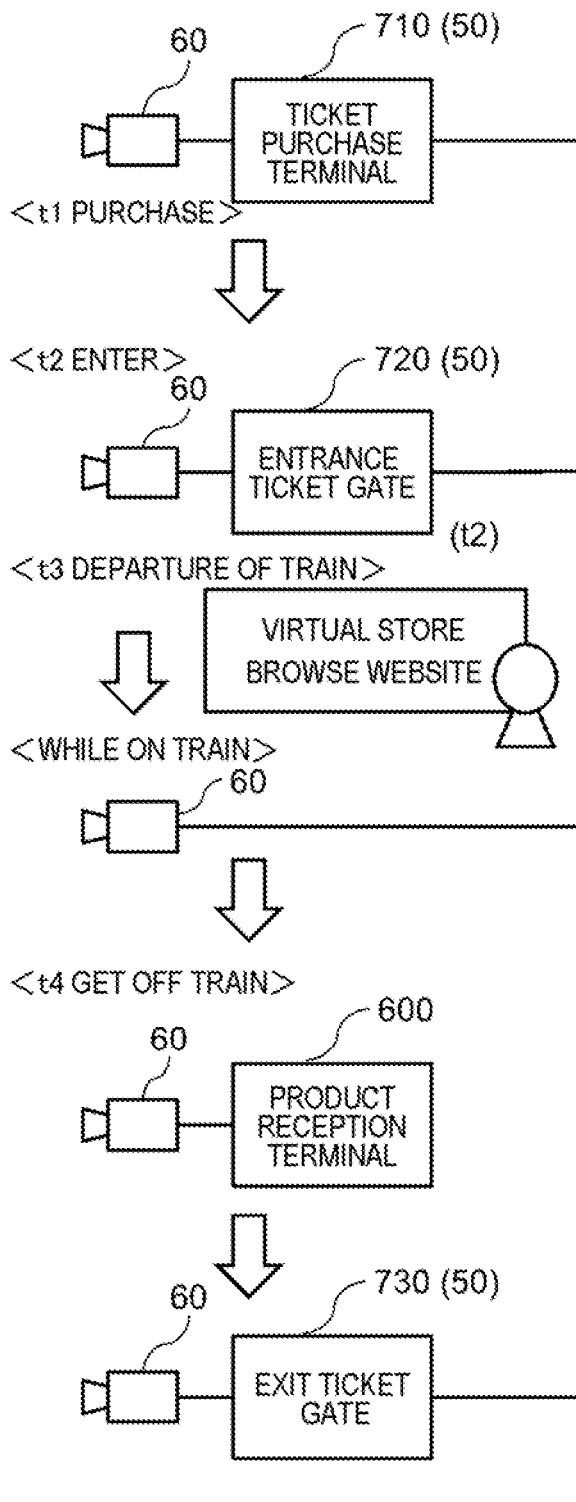
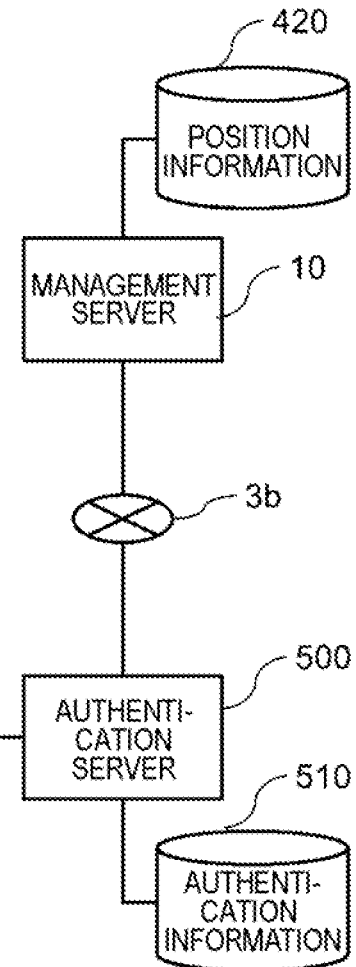

INFORMATION PROCESSING APPARATUS, INFORMATION PROCESSING METHOD, AND NON-TRANSITORY COMPUTER-READABLE STORAGE MEDIUM

This application is a National Stage Entry of PCT/JP2022/000863 filed on Jan. 13, 2022, which claims priority from Japanese Patent Application No. 2021-091801 filed on May 31, 2021, the contents of all of which are incorporated herein by reference, in their entirety.

TECHNICAL FIELD

The present invention relates to an information processing apparatus, an information processing method, and a program, and particularly, relates to an information processing apparatus, an information processing method, and a program for a virtual store system.

BACKGROUND ART

Due to global epidemic of an infectious disease, it is necessary to avoid shopping in a crowded store. Thus, a demand for so-called Internet shopping is increasing, but, on the other hand, it is necessary to keep a physical store alive in terms of protecting employment and rental income.

Patent Document 1 describes an electronic shopping system in which an order for fresh food is accepted on the Internet, a product is delivered to a locker in an unmanned receiving system installed at a base such as a convenience store, and a customer can receive the product from the locker.

Patent Document 2 describes a system that estimates a state of a user, and provides appropriate recommendation information. For example, the state of the user is a state of existing in a specific facility, a state of moving on foot or by train, being at work, being in class, or the like. The system according to Patent Document 2 provides a sales advertisement of an analog content (book) provided in a sales facility (bookstore) of the content, during movement around a content providing facility on foot.

Patent Document 3 describes a service providing apparatus for causing a customer to stay long at an Internet shopping site or a physical store, and changing behavior that affects frequent purchase. Patent Documents 4 and 5 each describe a contrivance, such as a drive-through, for receiving an order for a product in advance, and preparing and efficiently providing the product in time for a provision time.

Moreover, Patent Document 6 describes a product purchase reservation system in a duty-free store. Patent Document 7 describes a duty-free article sale and customs declaration support system.

RELATED DOCUMENTS

Patent Documents

Patent Document 1: Japanese Patent Application Publication No. 2002-269467
Patent Document 2: Japanese Patent Application Publication No. 2016-71741
Patent Document 3: Japanese Patent Application Publication No. 2015-153194
Patent Document 4: Japanese Patent Application Publication No. 2013-137755
Patent Document 5: Japanese Patent Application Publication (Translation of PCT Application) No. 2009-535703
Patent Document 6: Japanese Patent Application Publication No. 2002-74120
Patent Document 7: Japanese Patent Application Publication No. 2014-222436

SUMMARY OF INVENTION

Technical Problem

None of techniques described in the above documents describe or suggest a technique that sells a product by utilizing a virtual store in order to ease congestion in a physical store existing within a certain area, and can contribute to sales of the physical store within the area.

The present invention has been made in view of the above circumstances, and an object thereof is to provide a technique for easing congestion in a physical store, improving convenience of product purchase by a customer, and promoting sales.

Solution to Problem

Each aspect according to the present invention adopts each of the following configurations in order to solve the problem described above.

A first aspect relates to an information processing apparatus.

The information processing apparatus according to the first aspect includes:
 a position information acquisition unit that acquires position information of a customer; and
 an order reception unit that receives an order for product purchase by the customer at a virtual store, when the position information satisfies a criterion.

A second aspect relates to an information processing method executed by at least one computer.

The information processing method according to the second aspect includes,
 by an information processing apparatus:
 acquiring position information of a customer; and
 receiving an order for product purchase by the customer at a virtual store, when the position information satisfies a criterion.

Note that, another aspect according to the present invention may be a program that causes at least one computer to execute the method according to the second aspect described above, or may be a computer-readable storage medium storing such a program. The storage medium includes a non-transitory tangible medium.

The computer program includes a computer program code that causes, when executed by a computer, the computer to implement a management method on a management apparatus.

Note that, any combination of the above components and a conversion of an expression of the present invention among a method, an apparatus, a system, a storage medium, a computer program, and the like are also effective as a mode of the present invention.

Moreover, various components according to the present invention do not necessarily need to be existences independent of each other, and may be such that a plurality of components are formed as one member, one component is formed of a plurality of members, a certain component is a part of another component, or a part of a certain component overlaps with a part of another component.

Moreover, although the method and the computer program according to the present invention describe a plurality of procedures in order, the order of description does not limit an order in which the plurality of procedures are executed. Thus, when implementing the method and the computer program according to the present invention, the order of the plurality of procedures can be changed within a scope that does not cause inconvenience in terms of content.

Further, the plurality of procedures of the method and the computer program according to the present invention are not limited to being executed at individually different timing Thus, it may be such that, during execution of a certain procedure, another procedure occurs, execution timing of a certain procedure and execution timing of another procedure partly or entirely overlap with each other, or the like.

Advantageous Effects of Invention

According to each of the aspects described above, a technique that eases congestion in a physical store, improves convenience for product purchase by a customer, and promotes sales can be provided.

BRIEF DESCRIPTION OF THE DRAWINGS

FIG. 18 It is a diagram illustrating a data structure example of tax exemption history information.

FIG. 20 It is a functional block diagram logically illustrating a configuration of the information processing apparatus according to the example embodiment.

FIG. 24 It is a diagram illustrating a method for a customer to utilize a virtual store at a temporary port call of a cruise ship.

FIG. 26 It is a diagram for describing a method of utilizing a virtual store while riding a Shinkansen.

EXAMPLE EMBODIMENT

Hereinafter, example embodiments of the present invention are described by use of the drawings. Note that, in all of the drawings, a similar component is assigned with a similar reference sign, and description thereof is not included as appropriate. Moreover, in each of the following figures, a configuration of a portion that does not concern essence of the present invention is not included, and is not illustrated.

In the example embodiment, "acquisition" includes at least one of fetching, by a local apparatus, data or information stored in another apparatus or a storage medium (active acquisition), and inputting, into a local apparatus, data or information output from another apparatus (passive acquisition). Examples of active acquisition include requesting or inquiring of the another apparatus and receiving a reply thereof, accessing the another apparatus or the storage medium and reading, and the like. Moreover, an example of passive acquisition includes receiving information given by distribution (or transmission, push notification, or the like), and the like. Further, "acquisition" may include selecting and acquiring from received data or information, or selecting and receiving distributed data or information.

First Example Embodiment

<System Outline>

Figure 1:
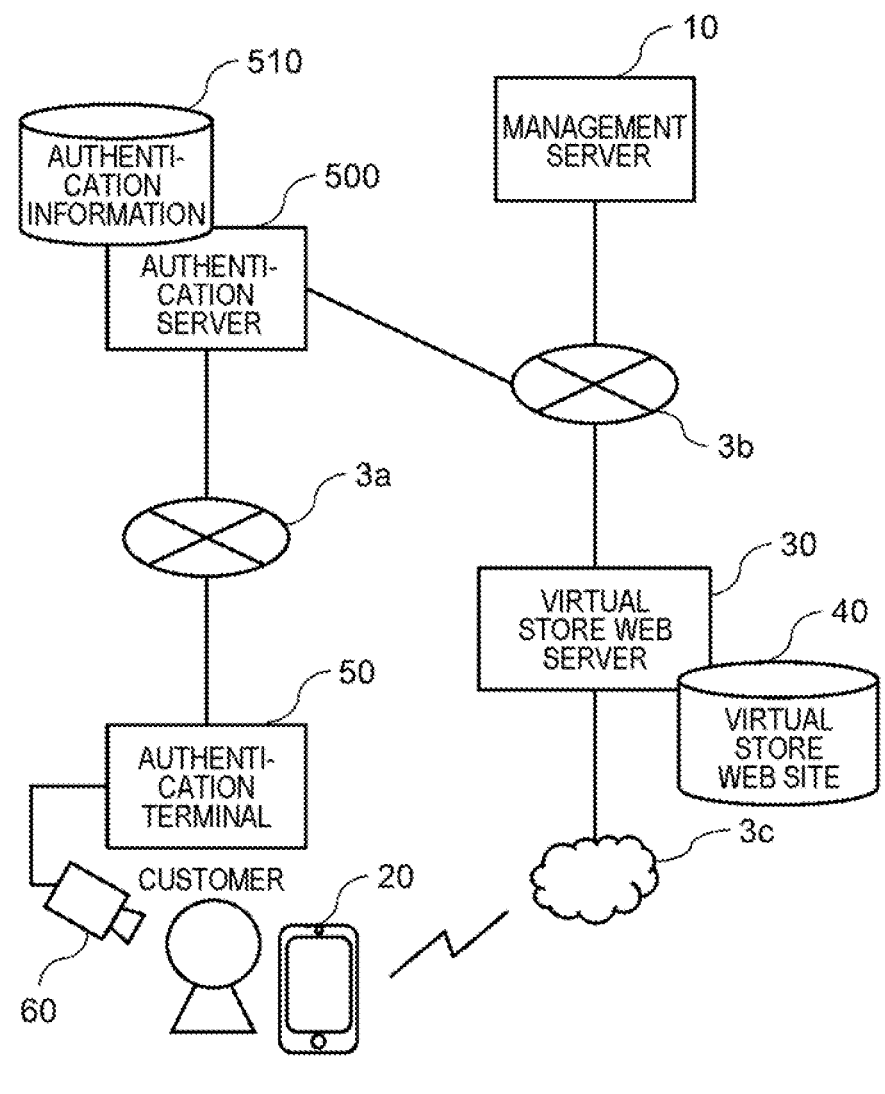
FIG. 1 It is a diagram conceptually illustrating a system configuration of a virtual store system according to an example embodiment of the present invention.

FIG. 1 is a diagram conceptually illustrating a system configuration of a virtual store system 1 according to an example embodiment of the present invention. The virtual store system 1 includes at least a management server 10, a user terminal 20, and a virtual store web server 30. Further, the virtual store system 1 may be further connected to an authentication server 500.

The authentication server 500 includes an authentication information storage unit 510 that previously stores biometric authentication information of a customer. The authentication server 500 is connected, via a communication network 3a, to, for example, an authentication terminal 50 that authenticates the customer by biometric authentication or the like by use of an image acquired by capturing an image of the customer with a camera 60 or the like. Note that, as described later, biometric authentication is not limited to a face image (feature information of a face), and various biometric authentication information (e.g., a fingerprint, a voiceprint, etc.) can also be used. In this case, various sensors being capable of acquiring biometric authentication information, such as a fingerprint sensor and a microphone, can be used as a means for acquiring biometric authentication.

A plurality of the authentication terminals 50 are installed in a specific area. The customer goes to a place of the authentication terminal 50, and performs biometric authentication. The authentication terminal 50 transmits information of the authenticated customer to the authentication server 500, and the authentication server 500 further stores an authentication result of the customer in the authentication information storage unit 510.

The authentication result includes information that can identify the customer (e.g., feature information of a face, etc.), identification information of the authentication terminal 50 (information that can determine a position where authentication of the customer by the authentication terminal 50 is performed), and a date and time when authentication is executed.

Figure 2:
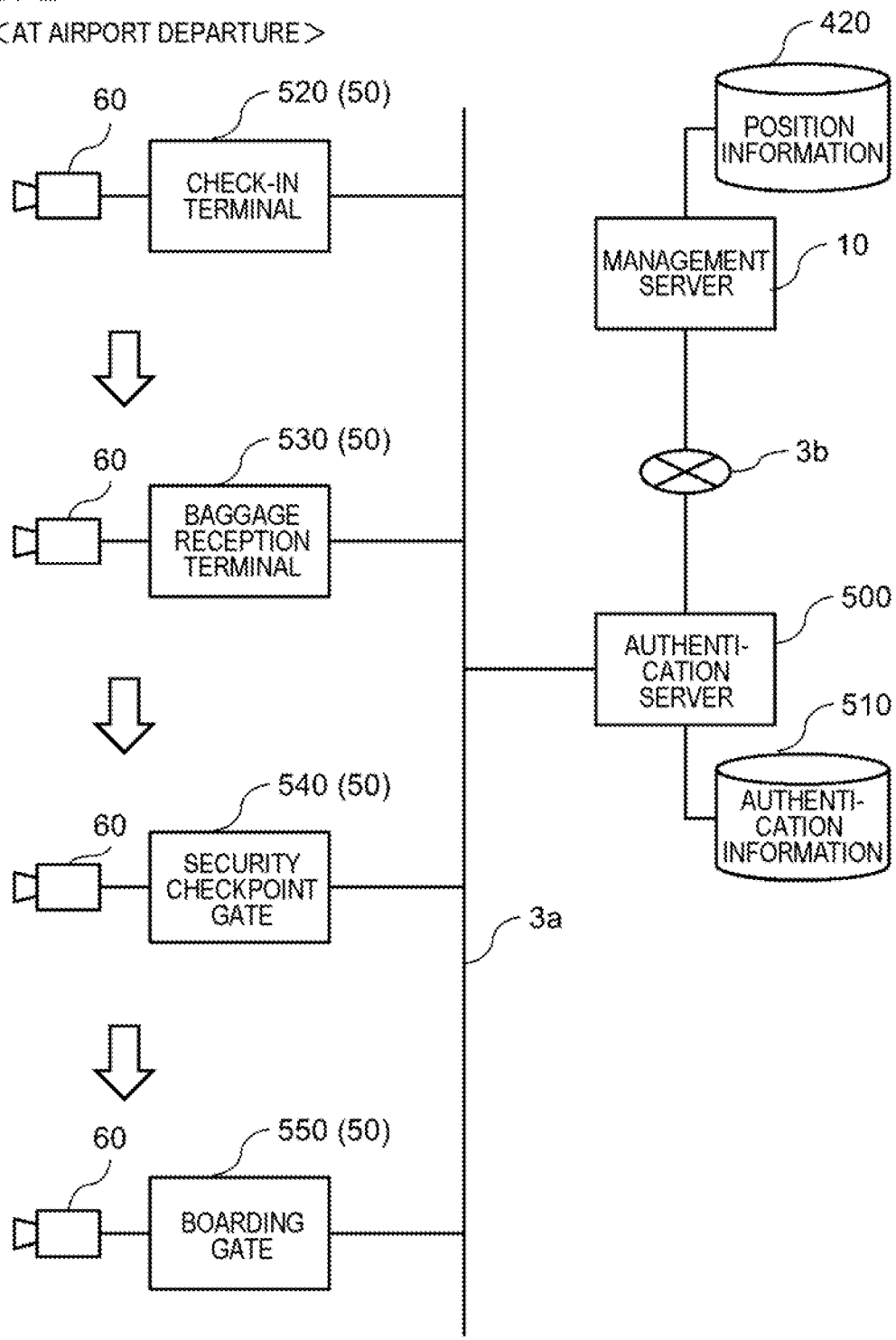
FIG. 2 It is a diagram illustrating a method for a customer to utilize a virtual store at an airport.

For example, as illustrated in FIG. 2, an airport where departure and arrival of an international flight are performed includes an authentication terminal 50 included in a check-in terminal 520 that performs check-in of a customer, an authentication terminal 50 included in a baggage reception terminal 530 that automatically performs a procedure of checking baggage, an authentication terminal 50 provided at a security checkpoint gate 540 that performs a security check for a customer at a security checkpoint, and an authentication terminal 50 provided at a boarding gate 550.

In this example, by performing authentication processing of the customer at each of the authentication terminals 50 provided at four places, a position of the customer is recorded together with date and time information from a result of the authentication. In the present example embodiment, the position of the customer is detected by use of information of the authentication result.

Returning to FIG. 1, the user terminal 20 is a terminal carried by the customer, and is, for example, a smartphone, a tablet terminal, or the like. An application for utilizing a service of the virtual store system 1 is previously installed in the user terminal 20, and the service of the virtual store system 1 can be utilized by activating the application.

For example, in the virtual store system 1, even without actually stopping by a duty-free store inside an airport, the customer can access a virtual store website 40, order a product at the duty-free store, drop in at a product delivery counter, product delivery locker, or the like, and accept the product, between a time after the security check and a time before boarding. Moreover, although details are described in an example embodiment described later, the virtual store system 1 can also perform a tax exemption procedure for a product purchased at a virtual store.

The customer becomes capable of shopping utilizing a virtual store, when being in a state where it can be confirmed that the customer is present in a predetermined place within an airport, i.e., has completed a security check and is present in an area for waiting for boarding. Since the customer can perform shopping without stopping at a physical store, congestion of a store can be eased, and, further, since the customer and a store clerk do not have to face each other, this also serve as an infectious disease prevention measure.

In a case of the present example embodiment, as described above, a position of a customer is determined by utilizing an authentication result by the authentication terminal 50 installed in each of the check-in terminal 520, the baggage reception terminal 530, the security checkpoint gate 540, and the boarding gate 550 utilized by the customer within an airport.

A customer needs to perform, in advance, utilization registration for an airport service such as an automatic check-in function utilizing the check-in terminal 520 or the like. The authentication server 500 previously accepts registration of biometric authentication information such as face image information of a customer and attribute information such as a name, an age (or a date of birth), and a gender, and stores the information in the authentication information storage unit 510. Further, the authentication server 500 may manage ticket information for a boarding schedule of a customer, and passport information.

Moreover, the customer previously performs user registration in order to utilize a service provided by the virtual store system 1. Account information (e.g., a user name (customer ID), a password, and the like) of the customer is registered in advance. Alternatively, existing social networking service (SNS) account information may be linked with. A virtual store website 40 may be accessed by activating a browser with the user terminal 20 instead of an application, and a service of the virtual store system 1 may be able to be utilized by logging in by use of the account information.

In the present example embodiment, identification information of the customer for airport service utilization is referred to as a user ID, and it is assumed that identification information of the customer for service utilization in the virtual store system 1 is referred to as a customer ID. However, pieces of identification information of the customer for an airport service and a service of the virtual store system 1 are linked with each other.

The virtual store web server 30 manages the virtual store website 40 of each virtual store, and constitutes, for example, a shopping mall on the web.

Hardware Configuration Example

Figure 3:
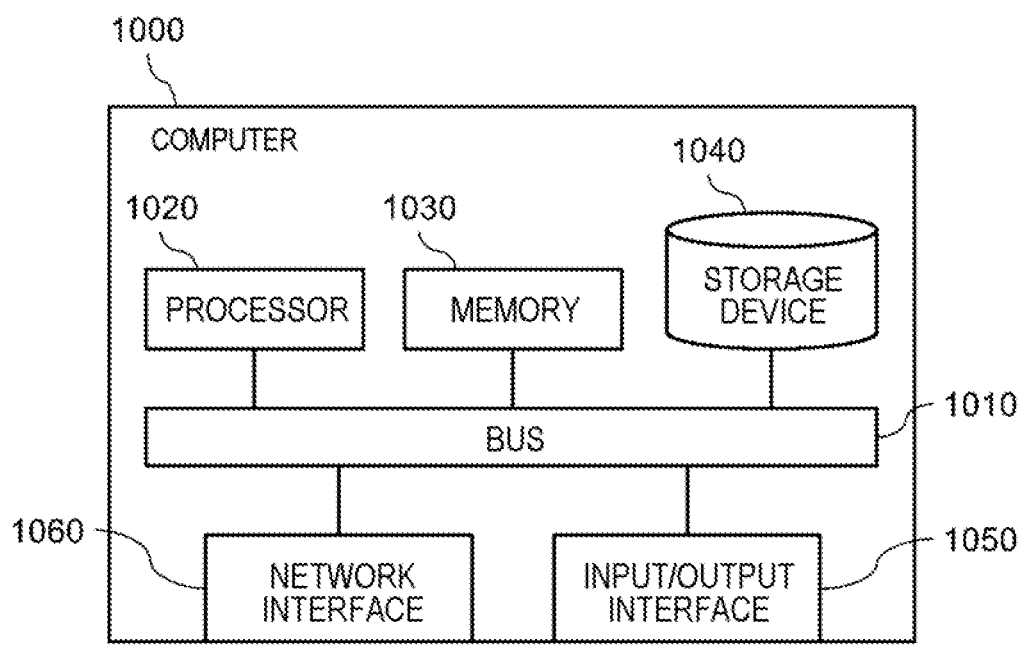
FIG. 3 It is a block diagram illustrating a hardware configuration of a computer that implements an information processing apparatus according to the example embodiment of the present invention.

FIG. 3 is a block diagram illustrating a hardware configuration of a computer 1000 that implements an information processing apparatus 100 described later. The information processing apparatus 100 is implemented by a combination of the management server 10 and the user terminal 20 in FIG. 1. The virtual store web server 30, the authentication terminal 50, and the like in FIG. 1 are also implemented by the computer 1000. Further, a product reception terminal 600, a store terminal 70, and the like that are described later are also implemented by the computer 1000. Moreover, the management server 10 and the virtual store web server 30 may be implemented by one computer. Each apparatus may be implemented by at least two computers. That is to say, the management server 10 and the virtual store web server 30 may be included in the same apparatus, or may be separate apparatuses.

The management server 10 and the virtual store web server 30 are implemented by, for example, a personal computer, a server computer, or the like. The user terminal 20 is, for example, a smartphone, a tablet terminal, a mobile phone, a personal digital assistant (PDA), a personal computer, or the like, and includes a touch panel having functions of a display unit and an operating unit, an operation accepting unit such as a switch, a sound input/output unit (a speaker and a microphone), a vibrating unit, and a camera.

The computer 1000 includes a bus 1010, a processor 1020, a memory 1030, a storage device 1040, an input/output interface 1050, and a network interface 1060.

The bus 1010 is a data transmission path through which the processor 1020, the memory 1030, the storage device 1040, the input/output interface 1050, and the network interface 1060 transmit/receive data to/from each another. However, a method of mutually connecting the processor 1020 and the like is not limited to bus connection.

The processor 1020 is a processor implemented by a central processing unit (CPU), a graphics processing unit (GPU), or the like.

The memory 1030 is a main storage apparatus implemented by a random access memory (RAM) or the like.

The storage device 1040 is an auxiliary storage apparatus implemented by a hard disk drive (HDD), a solid state drive (SSD), a memory card, a read only memory (ROM), or the like. The storage device 1040 stores a program module that implements each function (e.g., a position information acquisition unit 102, an order reception unit 104, a transmitting unit 110, a tax exemption processing unit 120, a notifying unit 130, a flight information acquisition unit 140, a train ride information acquisition unit 210, and the like described later) of the information processing apparatus 100. The processor 1020 reads each of the program modules onto the memory 1030, executes the read program module, and thereby implements each function being associated with the program module. Moreover, the storage device 1040 may also store each piece of data in a storage apparatus 400 of the management server 10, and a storage apparatus that stores the virtual store website 40 of the virtual store web server 30.

The program module may be stored in a storage medium. A storage medium storing the program module may include a non-transitory tangible medium usable by the computer 1000, and a program code readable by the computer 1000 (the processor 1020) may be embedded in the medium.

The input/output interface 1050 is an interface for connecting the computer 1000 to various kinds of input/output equipment. The input/output interface 1050 also functions as a communication interface that performs near-field wireless communication such as Bluetooth (registered trademark) and near field communication (NFC).

The network interface 1060 is an interface for connecting the computer 1000 to a communication network. The communication network is, for example, a local area network (LAN) or a wide area network (WAN). A method of connecting the network interface 1060 to the communication network may be wireless connection, or may be wired connection.

In the example of FIG. 1, each of the communication network 3a between the authentication terminal 50 and the authentication server 500, a communication network 3b between the management server 10 and the authentication terminal 50, and a communication network 3c between the user terminal 20 and the virtual store web server 30 is provided as an independent network. However, a network configuration is not limited thereto. The communication network 3a is a closed network that requires particularly high security management in order to communicate authentication information of a customer. The communication network 3b is, for example, a network such as an in-house local area network (LAN) that is accessible by an apparatus within the virtual store system 1. The communication network 3c is, for example, a network such as the Internet.

Then, the computer 1000 is connected to necessary equipment (e.g., in a case of the authentication server 500, the camera 60, a display, a touch panel, an operating unit, the authentication terminal 50, a code scanner, or the like) via the input/output interface 1050 or the network interface 1060.

The camera 60 or a camera mounted on the user terminal 20 includes an image capturing element such as a lens and a charge coupled device (CCD) image sensor. The camera is, for example, a network camera such as an Internet protocol (IP) camera. The network camera has, for example, a wireless local area network (LAN) communication function, and is connected to the authentication terminal 50 or connected to the authentication server 500 via a relay apparatus (not illustrated) such as a router of a communication network. Then, the camera may include a mechanism for performing control of orientation of a camera body or a lens, zoom control, focusing, and the like, following movement of a person.

An image generated by the camera is generated by capturing an image of a face of a customer, for example, when the customer stands in front of the authentication terminal 50. The images may be a moving image, may be a frame image at a predetermined interval, or may be a still image.

<Example of Functional Configuration>

Figure 4:
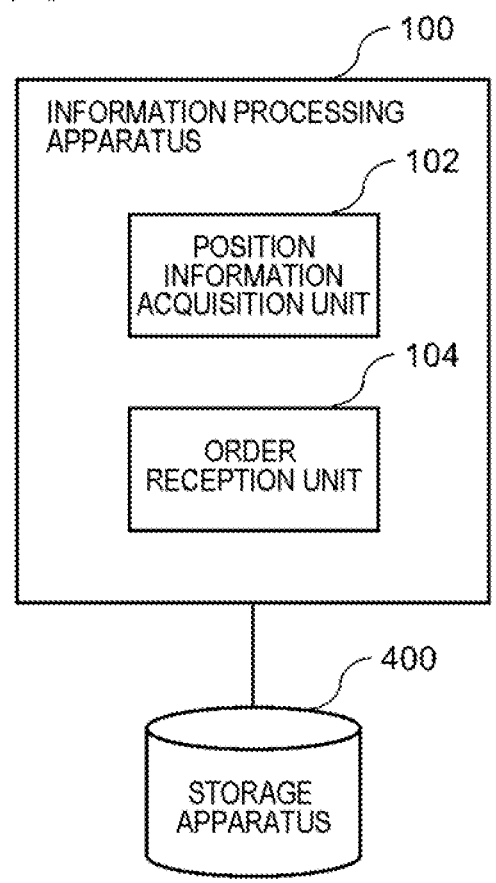
FIG. 4 It is a functional block diagram logically illustrating a configuration of the information processing apparatus.

FIG. 4 is a functional block diagram logically illustrating a configuration of the information processing apparatus 100 according to the example embodiment of the present invention.

The information processing apparatus 100 includes the position information acquisition unit 102 and the order reception unit 104. The position information acquisition unit 102 acquires position information of a customer. The order reception unit 104 receives an order for product purchase by the customer in a virtual store, when the position information satisfies a criterion.

The position information acquisition unit 102 acquires position information of the customer from the authentication server 500. As described above, the authentication server 500 acquires an authentication result of the customer from the authentication terminal 50, and stores the authentication result in the authentication information storage unit 510.

For example, an application for utilizing an airport service is previously installed on the user terminal 20 of the customer. When the airport service is utilized, the application is activated and, for example, a QR code (registered trademark) including a user ID of the customer and information necessary for check-in of the customer is displayed on a screen of a display. The authentication terminal 50 reads the QR code displayed on the user terminal 20, and acquires information of the customer. Further, the authentication terminal 50 captures an image of the face of the customer by use of the camera 60, extracts feature information of the face of the customer, collates the feature information with previously registered biometric authentication information, and performs biometric authentication of the customer.

Figure 5A:
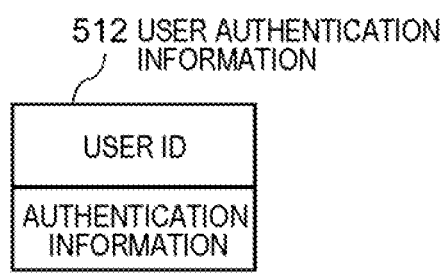
FIGS. 5A and 5B They are diagrams each illustrating a data structure example of information stored in an authentication information storage unit.
Figure 5B:
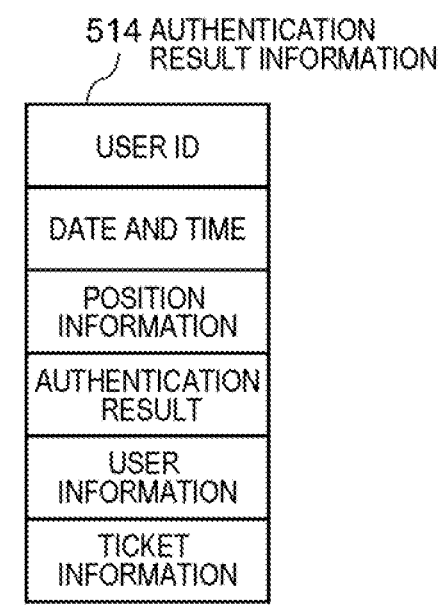

FIGS. 5A and 5B are diagrams each illustrating a data structure example of information stored in an authentication information storage unit 510. User authentication information 512 in FIG. 5A stores biometric authentication information such as a feature value of a face image of the customer, in association with a user ID being identification information of the customer. The biometric authentication information may be another piece of biometric authentication information other than feature information of a face. Another piece of biometric authentication information includes, for example, at least one feature value such as an iris, a vein, an auricle, a fingerprint, a voiceprint, a gait, a stature (a height, a shoulder width, a body length, a bone structure, and the like). Alternatively, at least two pieces of biometric authentication information may be combined.

Authentication result information 514 in FIG. 5B stores an authentication result by the authentication terminal 50. Authentication result information 514 includes user information including a user ID of a customer authenticated by each of the authentication terminals 50, a date and time of performing authentication, identification information of the authentication terminal 50 that has performed authentication (or the position information of the authentication terminal 50), an authentication result, and attribute information of the customer, ticket information for a boarding schedule of the customer, and the like.

Figure 6:
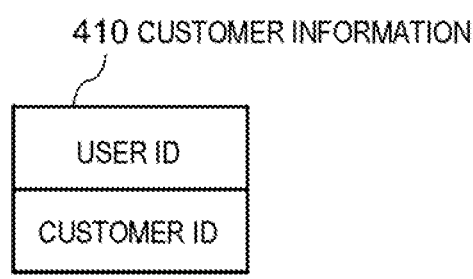
FIG. 6 It is a diagram illustrating one example of a data structure of customer information.

Returning to FIG. 4, when a login request of a customer to the virtual store system 1 is accepted, the position information acquisition unit 102 transmits, to the authentication server 500 (FIG. 1), a user ID being associated with a customer ID, in order to request position information being associated with the customer ID from the authentication server 500. Since a user ID for utilizing an application for utilizing an airport service and a customer ID for utilizing a service of the virtual store system 1 use different pieces of identification information, association of the user ID with the customer ID is previously performed, as below. However, the same identification information may be used for the user ID and the customer ID. FIG. 6 is a diagram illustrating one example of a data structure of customer information 410 associating a user ID with a customer ID. The customer information 410 stores a user ID at airport service utilization of the customer and a customer ID at virtual store service utilization of the customer in association with each other.

The customer information 410 may be stored in the authentication information storage unit 510 of the authentication server 500, or may be stored in the storage apparatus 400. When the customer information 410 is stored in the storage apparatus 400, the position information acquisition unit 102 refers to the customer information 410 in the storage apparatus 400, reads a user ID being associated with a customer ID, and notifies the authentication server 500 of the user ID. When the customer information 410 is stored in the authentication information storage unit 510, the position information acquisition unit 102 notifies the authentication server 500 of the customer ID, and requests position information of the customer. The authentication server 500 refers to the customer information 410 in the authentication information storage unit 510, and reads the user ID being associated with the customer ID.

The authentication server 500 reads the authentication result information 514 of the user ID from the authentication information storage unit 510, and transmits information indicating current position of the customer to the information processing apparatus 100 (the management server 10).

Figure 7:
FIG. 7 It is a diagram illustrating a data example of authentication result information of a certain customer.

FIG. 7 is a diagram illustrating a data example of the authentication result information 514 of a certain customer. In this example, it is illustrated that the customer passes through the authentication terminal 50 (position information P11) of the check-in terminal 520 at 10:05, then passes through the authentication terminal 50 (position information P25) of the baggage reception terminal 530 at 10:13, and passes through the authentication terminal 50 (position information P34) at the security checkpoint gate 540 at 10:20.

Note that, the date and time information may be a time when the authentication terminal 50 executes authentication processing, but may be one of a time when the camera 60 captures an image of the customer, a time when passage of the customer through a gate where the authentication terminal 50 is mounted is detected, a time when an operation of the authentication terminal 50 by the customer is accepted, and the like, and can be appropriately defined according to a configuration of the virtual store system 1.

In this way, position information can be indicated by each piece of identification information (e.g., P11, P12, P13, . . . , P21, P22, P23, . . . and the like) previously allocated to each of a plurality of the authentication terminals 50 in each place. However, the position information is not limited thereto, and information of global positioning system (GPS) that measures a coordinate from a signal of an artificial satellite indicating a position of the authentication terminal 50 may be used. Alternatively, the authentication terminal 50 may acquire, from the user terminal 20, information indicating a current location of a user determined from base station information or the like of a mobile phone or a wireless fidelity (Wi-Fi) terminal, and store the information as position information.

The position information acquisition unit 102 acquires position information being associated with a customer ID from the authentication server 500, and stores the position information in the position information 420 of the storage apparatus 400. Note that, the position information acquisition unit 102 acquires position information of a record for which an authentication result is successful ("OK" in the figure) in the authentication result information 514 of the authentication information storage unit 510, and does not acquire position information of a record for which an authentication result is unsuccessful.

Figure 8:
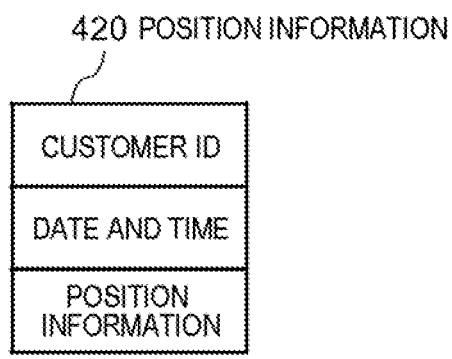
FIG. 8 It is a diagram illustrating a data structure example of position information stored in a storage apparatus.

FIG. 8 is a diagram illustrating a data structure example of position information 420 stored in the storage apparatus 400. The position information 420 is stored by associating date and time information and position information with the customer ID.

The order reception unit 104 determines whether the position information of the customer acquired by the position information acquisition unit 102 satisfies a criterion. The "criterion" indicates that the customer is present in a predetermined place or is in a predetermined state. In an example of utilization of a virtual store before departure at an airport, the criterion is that the customer has finished security check and is in a waiting state before boarding, or that the customer has passed through a security checkpoint and is present within an area where the customer should be before passing through a boarding gate. Another example (e.g., a time of port call of a cruise ship, and a time of utilization of a long-distance bus or a train) is described in an example embodiment described later.

In other words, the order reception unit 104 receives an order by the customer during a time in which the customer passes through a first gate and then passes through a second gate. In the present example embodiment, the first gate is the security checkpoint gate 540, and the second gate is the boarding gate 550. Another example is described in an example embodiment described later.

In the example described above, the position information acquisition unit 102 periodically inquires of the authentication server 500 about position information of the customer and acquires the position information, but, in another example, a configuration may be such that detection of passage of each gate by the customer is notified from the authentication server 500 to the management server 10.

Note that, in the present example embodiment, the information processing apparatus 100 is configured by one piece of hardware (e.g., the management server 10), but a part of the function of the information processing apparatus 100 may be implemented by the user terminal 20. For example, the authentication terminal 50 and the user terminal 20 may perform direct communication, and, thereby, the position information acquisition unit 102 may acquire an authentication result of a customer and transmit the authentication result to the management server 10. Moreover, the information processing apparatus 100 may be configured with a plurality of pieces of hardware (e.g., a plurality of servers). For example, the position information acquisition unit 102 of the information processing apparatus 100 may be implemented by the authentication server 500 and the management server 10, and the order reception unit 104 of the information processing apparatus 100 may be implemented by the virtual store web server 30 and the management server 10. However, a combination is not limited thereto.

Operation Example

Figure 9:
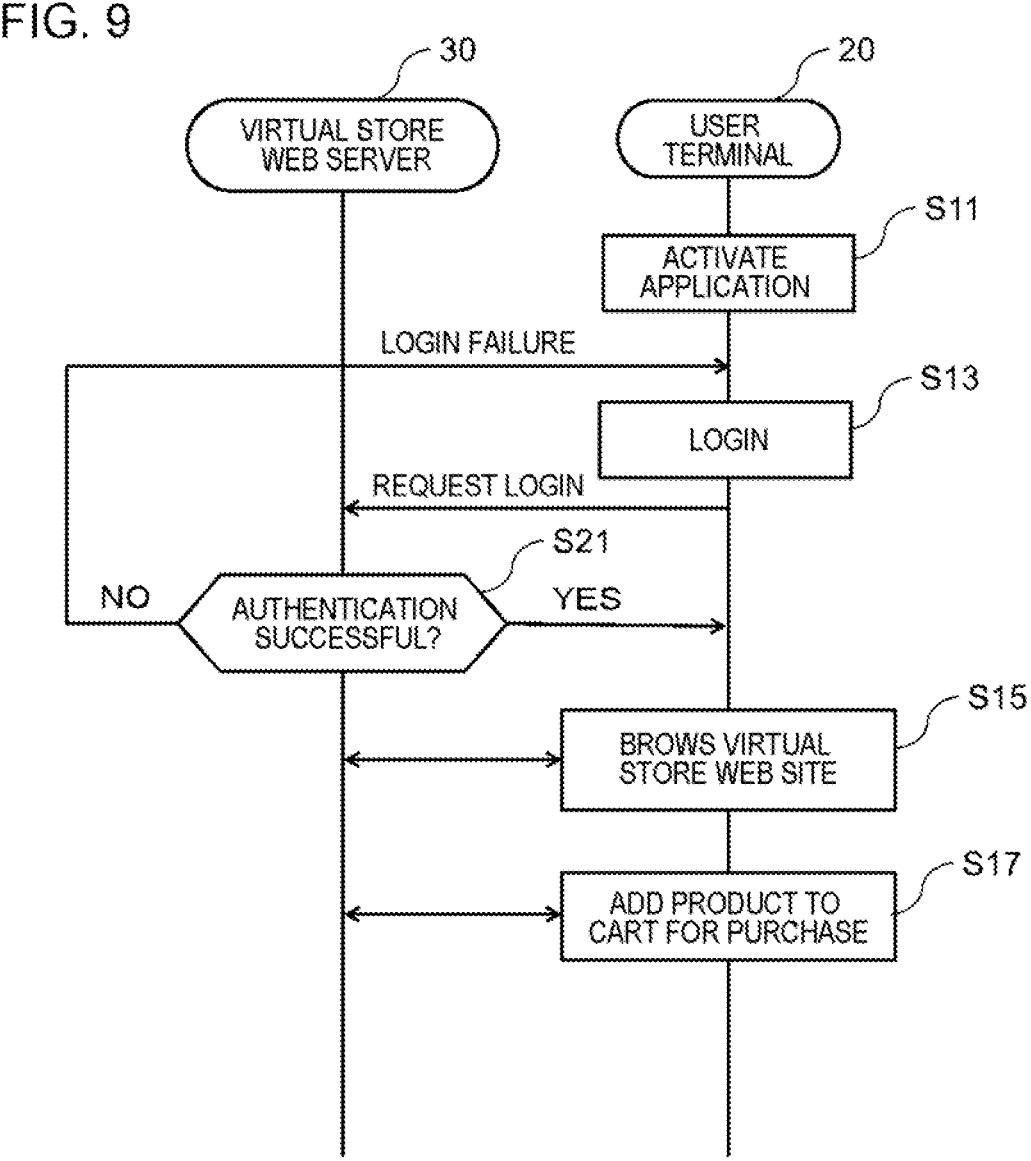
FIG. 9 It is a flowchart illustrating an operation example at product ordering utilizing a virtual store service using a user terminal.
Figure 10:
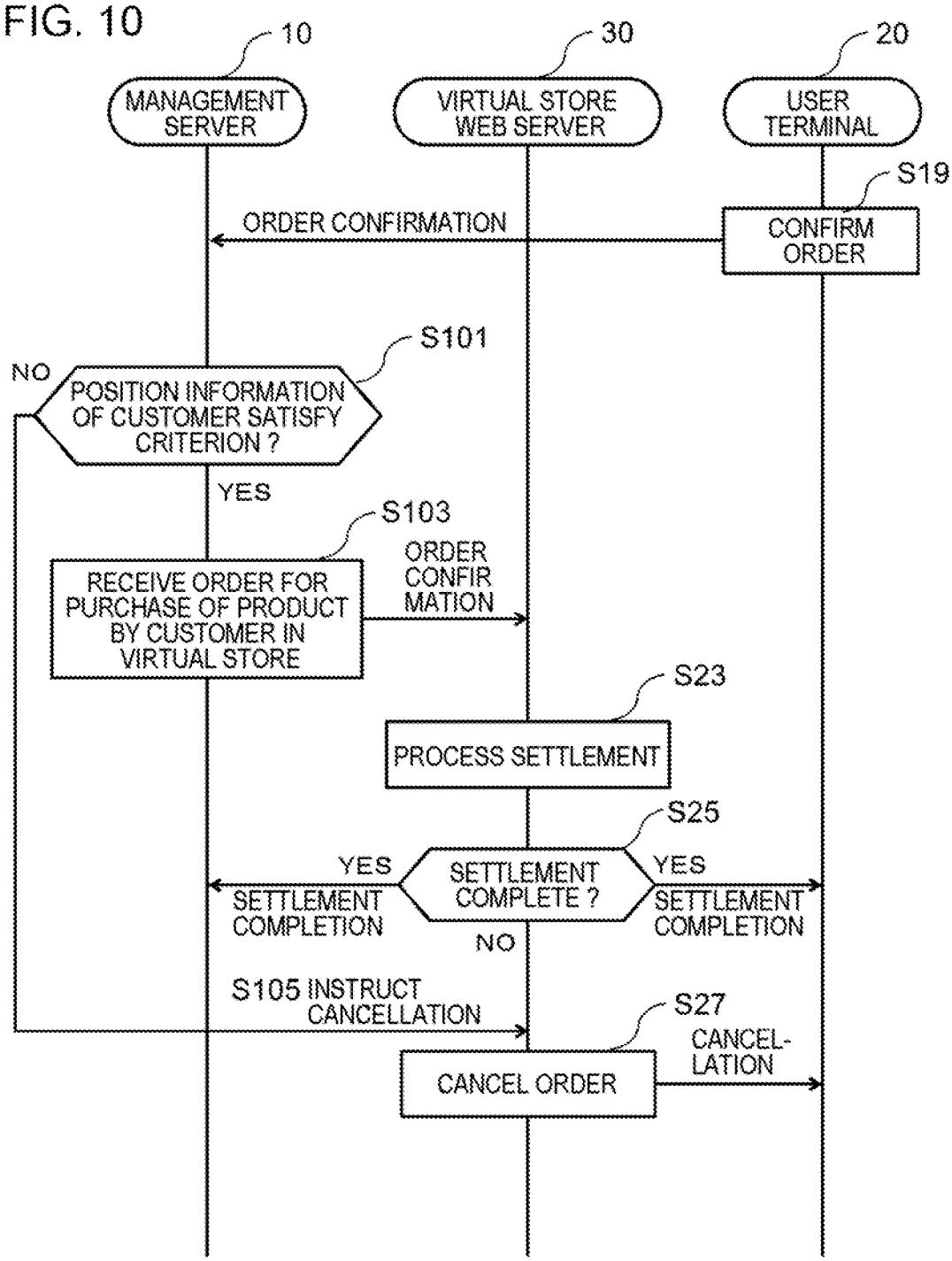
FIG. 10 It is a flowchart illustrating an operation example at propriety determination of order reception.

Herein, an operation when a customer utilizes a virtual store service by use of the user terminal 20 is described first by use of FIG. 9, and, then, an operation of performing determination of propriety of a content ordered by the user terminal 20 and receiving the order of a product is described by use of FIG. 10.

FIG. 9 is a flowchart illustrating an operation example at product ordering utilizing a virtual store service using the user terminal 20.

First, an application installed in the user terminal 20 is activated (step S11). Input of information necessary for login is accepted in a login screen for accessing the virtual store website 40 (step S13). The input may be, for example, input of a user name and a password, or input or the like of biometric authentication information by a fingerprint, a face image, or the like may be combined.

The accepted authentication information is transmitted to the virtual store web server 30 together with a login request. Then, the virtual store web server 30 performs authentication of the customer, based on the accepted authentication information, and permits the user terminal 20 to browse the virtual store website 40 when the authentication is successful (YES in step S21). On the other hand, when the authentication is unsuccessful (NO in step S21), the user terminal 20 is notified thereof, and the login screen is displayed again. After the authentication is successful, the virtual store website 40 is displayed on the user terminal 20, and the customer browses the virtual store website 40 (step S15). The virtual store website 40 can receive an order for a product at at least one duty-free store. The customer performs an operation of putting, into a cart, a product desired to be purchased (step S17).

In this way, in a flow of FIG. 9, the customer can browse a product in a virtual store and put the product in a cart regardless of a current position of the customer, but, in another example, a configuration may be such that, only when position information of a customer acquired by the position information acquisition unit 102 satisfies a criterion, browsing of a virtual store is permitted, or may be such that putting of a product at a virtual store in a cart is permitted. Moreover, an expiration term for a product put in a cart may be set.

Moreover, a plurality of criteria may be set, and a virtual store being capable of receiving an order may be set for each criterion. For example, a criterion is set for each airport, each floor, each area within a floor, or the like. That is to say, an accessible virtual store may be associated depending on which airport, which floor within the airport, and which area within the floor a position of a customer is present in. Moreover, some virtual stores may be set to be utilized in common.

FIG. 10 is a flowchart illustrating an operation example at propriety determination of order reception.

When confirmation of an order for a product put in a cart by the user terminal 20 is received (step S19), the position information acquisition unit 102 determines, in the management server 10, whether position information of a customer satisfies a criterion (step S101). In this example, it is determined whether the customer has passed through the security checkpoint gate 540, and is in a pre-boarding state (being present in a waiting place). When the criterion is satisfied (YES in step S101), purchase of the product is permitted, and the order is confirmed. The management server 10 notifies the virtual store web server 30 that the order of the customer may be confirmed, and the virtual store web server 30 confirms an order content placed in the cart, and performs settlement processing (step S23). On the other hand, when the criterion is not satisfied (NO in step S101), the order cannot be received, and, therefore, the virtual store web server 30 is instructed to perform cancel processing of the order (step S105). Then, the virtual store web server 30 performs cancel processing of the order for the product put in the cart, and notifies the user terminal 20 thereof (step S27).

Figure 11A:
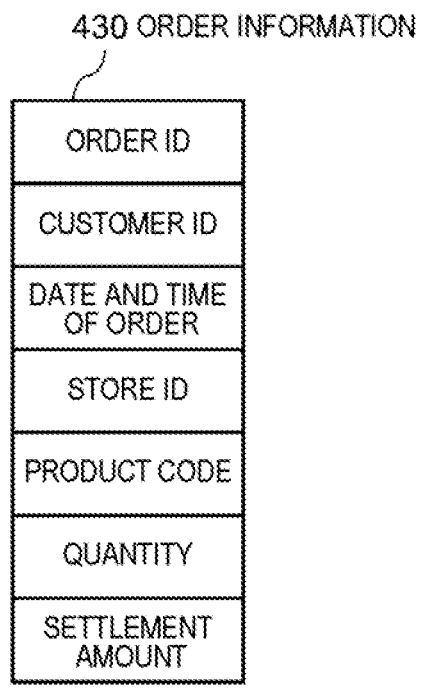
FIGS. 11A and 11B They are diagrams respectively illustrating data structures example of order information and settlement means information.
Figure 11B:
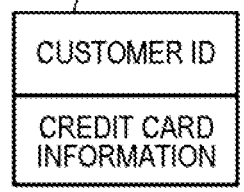

FIGS. 11A and 11B are diagrams respectively illustrating data structures example of order information 430 and settlement means information 412. The order information 430 indicates information of an ordered product placed in a cart, and, for example, information including, for each order, an order ID, a customer ID, an order date and time, a store ID of a virtual store, a product code, a quantity, and the settlement amount is stored. For the settlement means information 412, the settlement means (e.g., credit card information or the like) of the customer utilized in a virtual store is previously registered. The settlement means information 412 may be included in the customer information 410.

Returning to FIG. 10, the virtual store web server 30 performs, based on the order information 430, settlement processing by use of a settlement means of the customer registered in the settlement means information 412 (step S23). When settlement is completed (YES in step S25), the user terminal 20 is notified that the settlement processing has been completed. Moreover, the virtual store web server 30 also notifies the management server 10 that the settlement processing of the order of the customer has been completed. When settlement is unsuccessful (NO in step S25), cancel processing is performed for the order for the product put in the cart, and the user terminal 20 is notified thereof (step S27).

As described above, according to the present example embodiment, the position information acquisition unit 102 acquires position information of a customer, the order reception unit 104 receives, for example, an order for a purchase product in a virtual store of a duty-free store when the position information of the customer satisfies the criterion, for example, after the security checkpoint gate 540 is passed through, and, therefore, the customer can order a product without going to a physical store. Thereby, congestion in the physical store can be eased, the customer can store efficiently, and sales of a product in a store are promoted.

Second Example Embodiment

Figure 12:
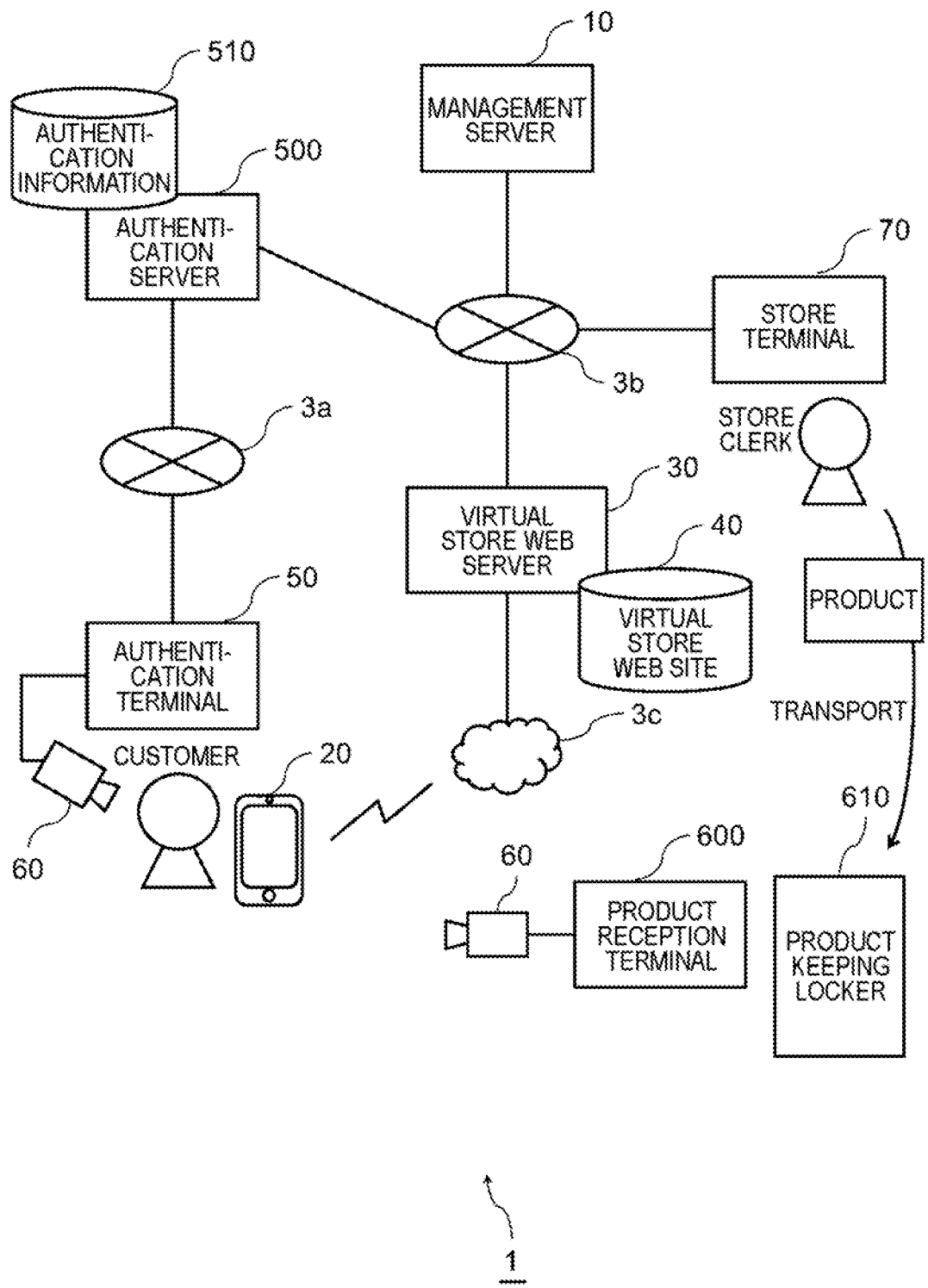
FIG. 12 It is a diagram conceptually illustrating a system configuration of a virtual store system according to an example embodiment.
Figure 13:
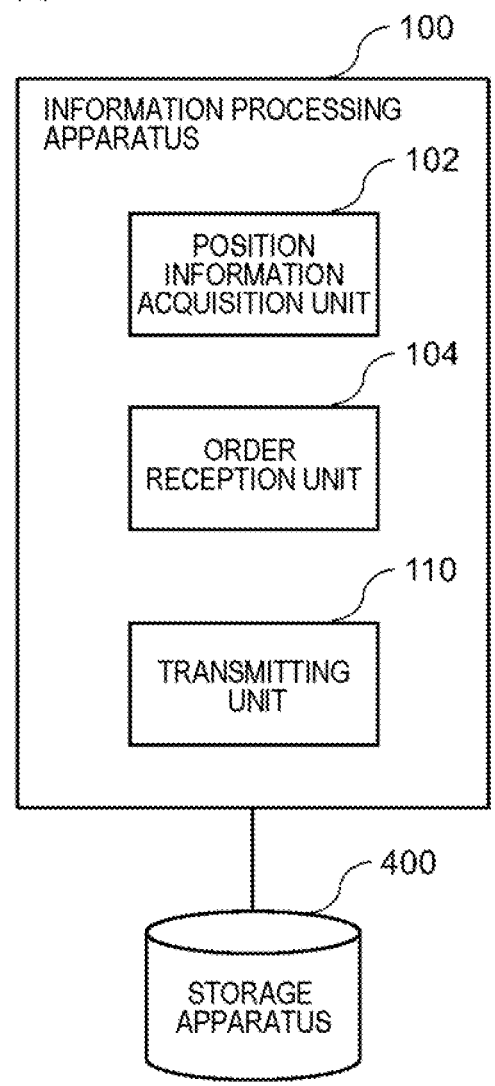
FIG. 13 It is a functional block diagram logically illustrating a configuration of an information processing apparatus according to the example embodiment.

The present example embodiment is the same as the example embodiment described above except for including a configuration that performs processing for a customer to receive a product purchased in the example embodiment described above. FIG. 12 is a diagram conceptually illustrating a system configuration of a virtual store system 1 according to the second example embodiment. FIG. 13 is a functional block diagram logically illustrating a configuration of an information processing apparatus 100 according to the second example embodiment.

The information processing apparatus 100 in FIG. 13 further includes a transmitting unit 110 in addition to the configuration of the information processing apparatus 100 in FIG. 4. Moreover, the virtual store system 1 in FIG. 12 further includes a store terminal 70 and a product reception terminal 600 in addition to the configuration of the virtual store system 1 of FIG. 1. However, the virtual store system 1 and the information processing apparatus 100 according to the present example embodiment may be combined with at least one of configurations according to other example embodiments within a range that does not cause contradiction.

System Configuration Example

As illustrated in FIG. 12, the virtual store system 1 includes the store terminal 70 installed in a physical store that handles a product of a virtual store, and the product reception terminal 600 for performing authentication processing of a customer when baggage kept in a product keeping locker 610 is received. Order information, received by a virtual store web server 30, for which settlement processing is completed is transmitted to the store terminal 70 as order placement information.

The store terminal 70 is a smartphone, a tablet terminal, a personal computer, or the like. The store terminal 70 is also configured by a computer 1000 in FIG. 3. In the present example embodiment, the store terminal 70 is described with a smartphone carried by a store clerk as an example, but the store terminal 70 may be a plurality of terminals, and may have, for example, a configuration in which a personal computer installed in a store is combined with a smartphone or a tablet terminal carried by each store clerk.

A product reception terminal 600 may have a configuration similar to that of an authentication terminal 50, and may capture, with a camera 60, an image of a face of a customer who has come to the product keeping locker 610 to receive baggage, and cause an authentication server 500 to execute biometric authentication processing of the customer. In the present example embodiment, the product reception terminal 600 includes a code scanner (not illustrated) that reads a QR code displayed on a user terminal 20.

Note that, stock status of a product may be managed on the virtual store web server 30, and a configuration may be adopted in which putting of only a product in stock in a cart is accepted. Alternatively, the management server 10 may perform notification of an inquiry to the store terminal 70 before the management server 10 performs settlement processing, stock information may be returned to the management server 10 after a store clerk checks stock of a product, and the management server 10 may be able to perform settlement processing when the product is in stock.

<Example of Functional Configuration>

As illustrated in FIG. 13, the information processing apparatus 100 further includes a transmitting unit 110.

According to an order received by the position information acquisition unit 102, after purchase processing is performed and then a product is moved to a product delivery place, the transmitting unit 110 transmits, to the user terminal 20 of the customer, information necessary for receiving the product.

The product delivery place is a locker (the product keeping locker 610 in FIG. 1), and information necessary for receiving a product includes unlocking information for the locker 610.

As another product delivery place, a receiving counter within a specific area (e.g., a bonded area), a place in front of boarding gate, or the like can be conceived. Further, a current location of a customer may be acquired, and a predetermined place within an area where the customer is currently present may be designated as a delivery place. Position information of a customer may be inquired of the authentication server 500, or may be acquired from the user terminal 20 of the customer. For example, information of a GPS that measures a coordinate from a signal of an artificial satellite indicating a position of the user terminal 20 may be acquired from the user terminal 20, or information indicating a current location of a customer determined from base station information or the like in which the user terminal 20 communicates with a mobile phone network or a Wi-Fi terminal may be acquired from the user terminal 20 and stored as position information.

Operation Example

Figure 14:
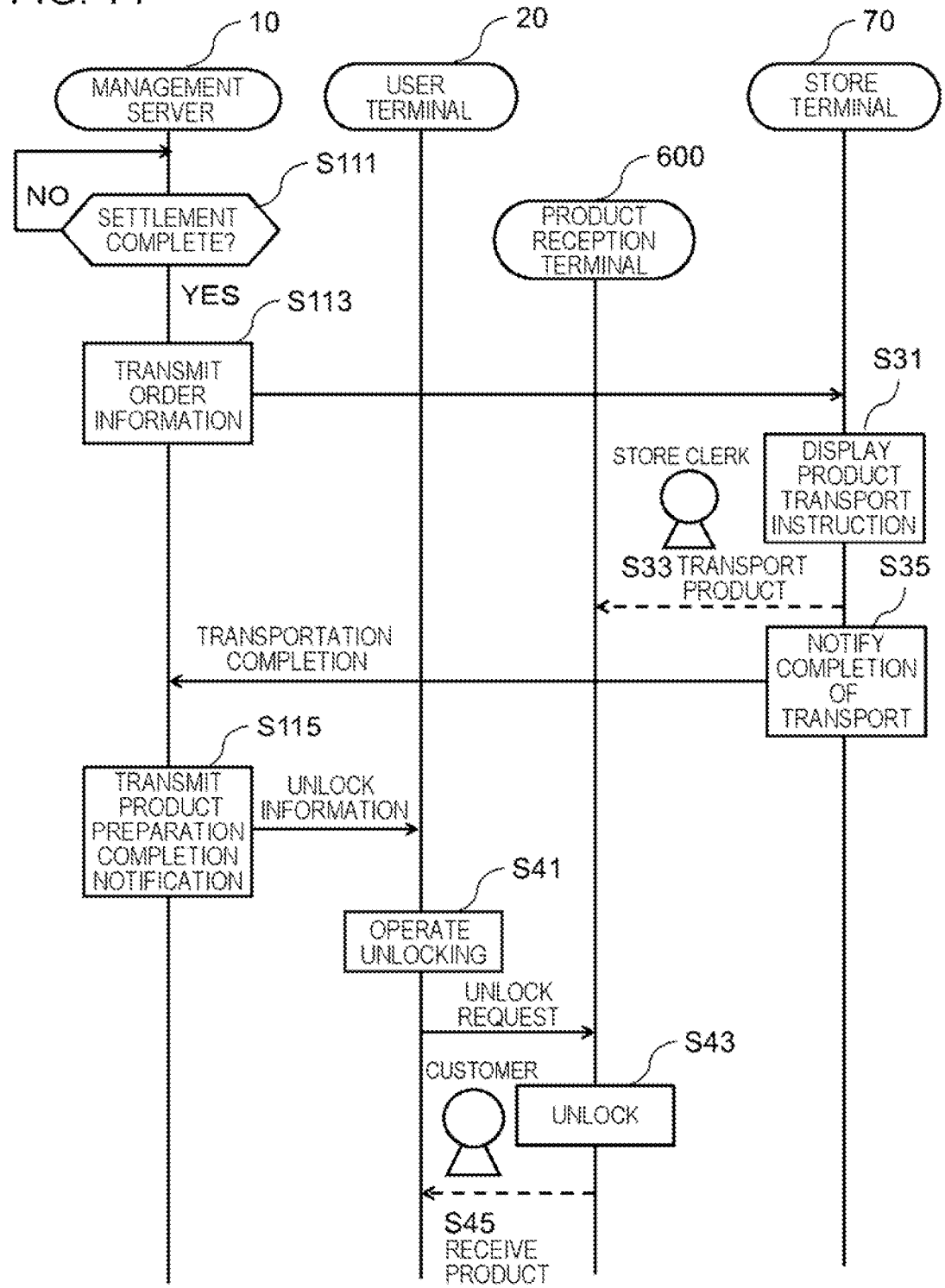
FIG. 14 It is a flowchart illustrating an operation example of a virtual store system.

FIG. 14 is a flowchart illustrating an operation example of the virtual store system 1.

When receiving the settlement a completion notification of settlement processing from the virtual store web server 30 (YES in step S111), the transmitting unit 110 of the management server 10 transmits a product transport instruction including order information to the store terminal 70 (step S113). The store terminal 70 displays, on a display, order information included in the instruction for product transport received from the management server 10, and notifies a store clerk of the instruction for product transport (step S31). Various notification methods can be conceived, and, for example, at least one of pop-up display on the display, a sound output, and a vibration output may be used. When receiving the notification, the store clerk prepares a product, and transports the product to the product keeping locker 610 (step S33).

The store clerk puts the product in a predetermined position of the product keeping locker 610. The store terminal 70 causes the store clerk to input a locker number indicating a position of a locker in which the product is put. The store terminal 70 returns, to the management server 10, a transport completion notification including the input locker number (step S35). In the example, a configuration is adopted in which a store clerk inputs a keeping place of a product, but, in another example, the management server 10 may previously manage vacancy status of the product keeping locker 610, specify a locker number keeping a product, transmits the specified locker number to the store terminal 70 in such a way as to include the locker number in the product transport instruction. The store clerk may put the product in the position of the locker number displayed on the store terminal 70.

Figure 15:
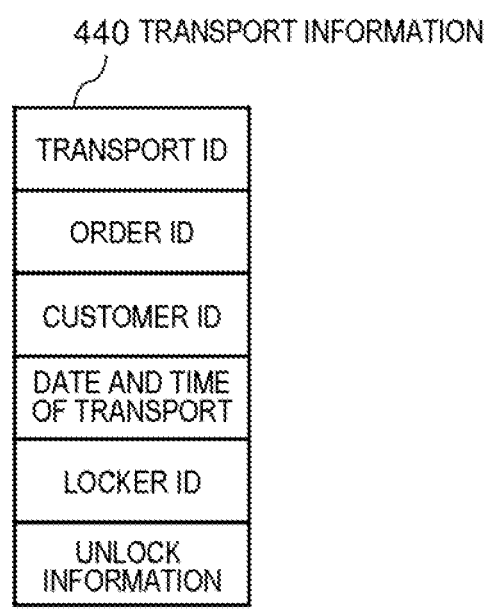
FIG. 15 It is a diagram illustrating a data structure example of transport information.

FIG. 15 is a diagram illustrating a data structure example of transport information 440. The transport information 440 stores a transport ID, an order ID, a customer ID, a transport date and time, a locker ID, unlocking information, and the like for each transport instruction of a product. The locker ID is not particularly limited as long as the locker ID is information that can determine a position of a locker. The unlocking information may be, for example, a combination information of a number and an alphabetical letter such as a password number, but is not particularly limited. Moreover, a configuration may be adopted in which a product reception terminal 600 is equipped with the authentication terminal 50 instead of unlocking information, an image of a face of a customer is captured by the camera 60 by use of the authentication terminal 50, collation with biometric authentication information of a user ID being associated with a customer ID is performed, and a locker is unlocked when authentication is successful.

When receiving a transport completion notification of a product from the store terminal 70, the transmitting unit 110 of the management server 10 transmits, to the user terminal 20, product preparation completion notification including unlocking information of the locker (step S115). For example, the management server 10 transmits, to the user terminal 20, a QR code including, included in a product preparation completion notification, information indicating product keeping position of the product keeping locker 610 and information for unlocking a locker at the keeping position.

As an unlocking operation, the customer causes the user terminal 20 to display a QR code, and causes a code scanner of the product reception terminal 600 to read the QR code (step S41). The product reception terminal 600 acquires, from the read QR code, a position of a locker to be unlocked and unlocking information, and unlocks the locker at the acquired position by use of the unlocking information (step S43). The customer takes out the product from the unlocked locker, and receives the product (step S45).

Alternatively, the unlocking processing may be configured to be executed from the management server 10. The QR code transmitted to the user terminal 20 may include an order ID identifying order information of the customer, thereby, the product reception terminal 600 may transmit, to the management server 10, the order ID read from the QR code, and the management server 10 may refer to the transport information 440 and acquire a locker ID indicating a position of a locker in which a product is kept, and transmit, to the product reception terminal 600, an unlocking instruction for the locker. The product reception terminal 600 unlocks the locker that has received the unlocking instruction from the management server 10.

Moreover, as described above, a configuration may be adopted in which the authentication terminal 50 mounted on the product reception terminal 600 performs biometric authentication processing of the customer, and, when the authentication is successful, the locker in which a product ordered by the customer is kept is unlocked.

A configuration may be adopted in which, instead of transmission of unlocking information to the user terminal 20 by the transmitting unit 110, a QR code including unlocking information can be displayed on a user-dedicated web page of the customer. The customer may log in to the virtual store website 40 by use of the user terminal 20, access a web page dedicated to the customer, and display a QR code. Moreover, a configuration may be such that the transmitting unit 110 transmits a password number for unlocking to the user terminal 20, and the customer inputs the password number according to an operation screen of the product reception terminal 600.

Moreover, a configuration can be such that a product is not kept in the product keeping locker 610, but a clerk in charge delivers a product to a customer at a product delivery counter. In this case, the transport information 440 stores a keeping place of a transported product (e.g., information indicating a position of the product keeping rack), instead of a locker ID. Then, the product reception terminal 600 reads a QR code displayed on the user terminal 20 of the customer, thereby acquires order information (order ID) of a product ordered by the customer, acquires a keeping place of the transported product, and displays the keeping place on the display. The clerk in charge hands over, to the customer, the product kept in the keeping place displayed on the display. In this case as well, instead of using a QR code, biometric authentication processing may be performed by use of a face image acquired by capturing, with the camera 60, an image of a face of a customer who has visited a counter, and when authentication is successful, transport information being associated with a customer ID of the customer may be acquired, and a keeping place of the product may be acquired.

The information processing apparatus 100 according to the present example embodiment may further include a notifying unit 130. A leaving term for a customer from a predetermined region is set, and, when a locker in which a product is kept is not unlocked by the leaving term, the notifying unit 130 transmits information indicating this to a management terminal (e.g., the store terminal 70).

The predetermined region refers to an area where a customer can be present before passing through a security checkpoint gate 540 and then passing through a boarding gate 550. The leaving term is, for example, 10 minutes before a departure time of a flight that a customer is scheduled to board, or the like, but is not limited thereto.

For example, the information processing apparatus 100 may further include a ticket information acquisition unit (not illustrated) that acquires ticket information of a customer acquired by a check-in terminal 520. Then, the notifying unit 130 sets 10 minutes before a departure time of a flight, indicated by the acquired ticket information, that a customer is scheduled to board, to a leaving term of the customer from the predetermined region. Alternatively, the leaving term may be a time when the customer passes through the boarding gate 550. That is to say, when the customer passes through the boarding gate 550 before receiving a product in a locker, the notifying unit 130 may transmit information indicating this to the store terminal 70.

Information indicating that the locker is not unlocked by the leaving term includes at least one of a customer ID of a customer who has ordered a product kept in a locker to be a target, an order ID of ordered order information, a transport ID of transport information, and a locker ID of a keeping destination, and includes information indicating that a product has not been received. Further, information for unlocking a locker in which a product targeted for collection is kept may also be included.

The store terminal 70 displays the information on a display. A store clerk receives a notification, and performs collection of a product from a locker. The store terminal 70 displays, on the display, a QR code including information for unlocking a locker keeping a product targeted for collection, and causes a code scanner of the product reception terminal 600 to read the QR code. The product reception terminal 600 unlocks the locker by use of the unlocking information. A store clerk can collect the product from the unlocked locker.

Further, at a predetermined timing, an order reception unit 104 may execute order cancel processing for a collected product. A timing of performing cancellation due to product collection is considered to be, for example, a timing at which a product is collected from a locker and then a store clerk performs input of confirming the product, or the like, but is not limited thereto.

According to the present example embodiment, an advantageous effect similar to that according to the example embodiment described above is provided, and, further, since a product is transported to a receiving place and then information necessary for receiving the product is transmitted to the user terminal 20 of a customer by the transmitting unit 110, the customer can receive the product smoothly. Moreover, in a configuration using the product keeping locker 610, a product can be received in a non-contact way without facing a clerk in charge, and this also serves as an infectious disease countermeasure. Further, when the product keeping locker 610 is not unlocked by a leaving term (e.g., 30 minutes before a departure time of a flight) of a customer, the notifying unit 130 notifies the store terminal 70 or the like, and, therefore, a store clerk can collect a product, and can also perform cancel processing of an order.

Third Example Embodiment

Figure 16:
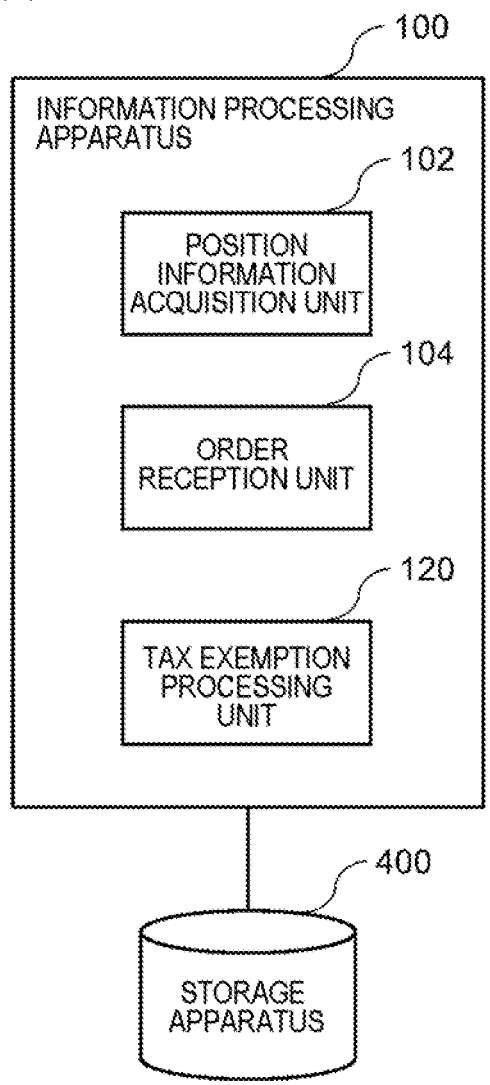
FIG. 16 It is a functional block diagram logically illustrating a configuration of the information processing apparatus according to the example embodiment.

The present example embodiment is the same as any of the example embodiments described above, except for including a configuration that performs tax exemption processing for a product purchased in the example embodiment described above. FIG. 16 is a functional block diagram logically illustrating a configuration of an information processing apparatus 100 according to the third example embodiment. A virtual store system 1 according to the third example embodiment is the same as that according to the second example embodiment illustrated in FIG. 12.

Functional Configuration Example

The information processing apparatus 100 in FIG. 16 further includes a tax exemption processing unit 120 in addition to a configuration of the information processing apparatus 100 in FIG. 4. However, the virtual store system 1 and the information processing apparatus 100 according to the present example embodiment may be combined with at least one of the configurations according to another example embodiment within a range that does not cause contradiction.

In the present example embodiment, receipt of a product may be in a form of receiving from a clerk in charge by a product receiving counter, or may be in a form by a product keeping locker 610 described in the second example embodiment. A product reception terminal 600 is installed at the product receiving counter.

Figure 17:
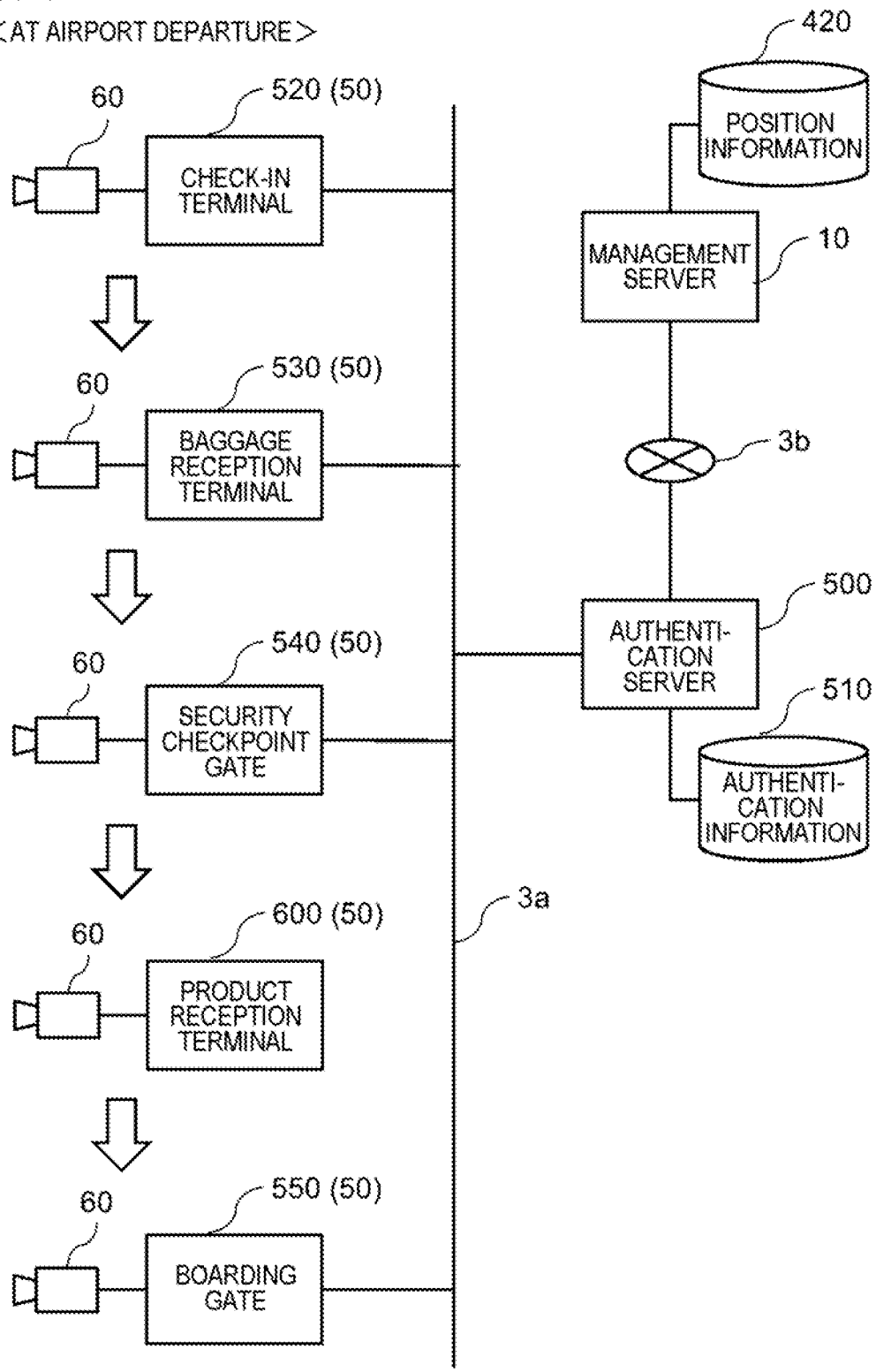
FIG. 17 It is a diagram illustrating a method for a customer who purchases a duty-free article at an airport uses to utilize a virtual store.

The tax exemption processing unit 120 executes processing relating to tax exemption of a product for which an order has been received by the order reception unit 104. As illustrated in FIG. 17, the tax exemption processing unit 120 executes and completes processing relating to tax exemption during a time in which after a customer has finished a departure inspection at a security checkpoint gate 540 in front of a boarding gate 550 and until before passing through the boarding gate 550. For example, the customer passes through the security checkpoint gate 540, then accesses a virtual store website 40, performs order processing of product purchase, then goes to a place of the product reception terminal 600, and performs a receipt procedure of the product. In this instance, the information processing apparatus 100 performs processing relating to tax exemption, and, when the processing relating to tax exemption is completed, the customer becomes capable of delivering of the product.

In order to execute processing relating to tax exemption, the management server 10 may acquire passport information of a customer, for example, by the security checkpoint gate 540 or an authentication terminal 50 of the product reception terminal 600. For example, electronic passport information previously registered in a user terminal 20 of a customer may be acquired from the user terminal 20 after identification of the customer and with consent of the customer. Alternatively, sheet of a passport to which a face photograph is pasted may be read with a scanner, and passport information may be acquired by image recognition processing and optical character reader (OCR). Alternatively, passport information may also be registered in advance at user registration.

The passport information includes, for example, a passport number, a name, a nationality, a date of birth, a gender, an expiration term of a passport, a face photograph of a customer, and the like. Further, information relating to a tax exemption procedure received before being associated with the passport, or the like may be accumulated in a storage apparatus 400 as tax exemption history information 450 for each customer.

FIG. 18 is a diagram illustrating a data structure example of the tax exemption history information 450. The tax exemption history information 450 includes, for each customer, a customer ID, a passport number, a purchase date, a purchase store ID, purchase product information (a product name, a quantity, a price), and a total amount, for example, as information of a purchase product to be a tax exemption target. Further, the tax exemption history information 450 may include, as a history of tax exemption processing, a tax exemption processing date, tax exemption information (e.g., product information that has been already exempted (a product name, a quantity, and a price and total amount)), and taxation information (information of a product exceeding an upper limit of a tax exempted amount and targeted for taxation (a product name, a quantity, and a price and a total amount).

The tax exemption processing unit 120 refers to the information of the tax exemption history information 450, and executes tax exemption processing, based on order information 430 of a product purchased at a virtual store. Information after execution is further accumulated in tax exemption history information 450. The tax exemption processing unit 120 may further perform processing for refunding an exempted amount to a customer. A refund amount may be displayed on a display of the product reception terminal 600 and thereby presented to a clerk in charge, and the clerk in charge may refund the customer in cash. Alternatively, based on credit card information previously registered as a settlement means of a customer, and refund procedure processing for a credit card company may be executed. Alternatively, based on electronic money account information previously registered by a customer, transfer processing of a refund amount to an electronic money account of a customer may be executed.

Operation Example

Figure 19:
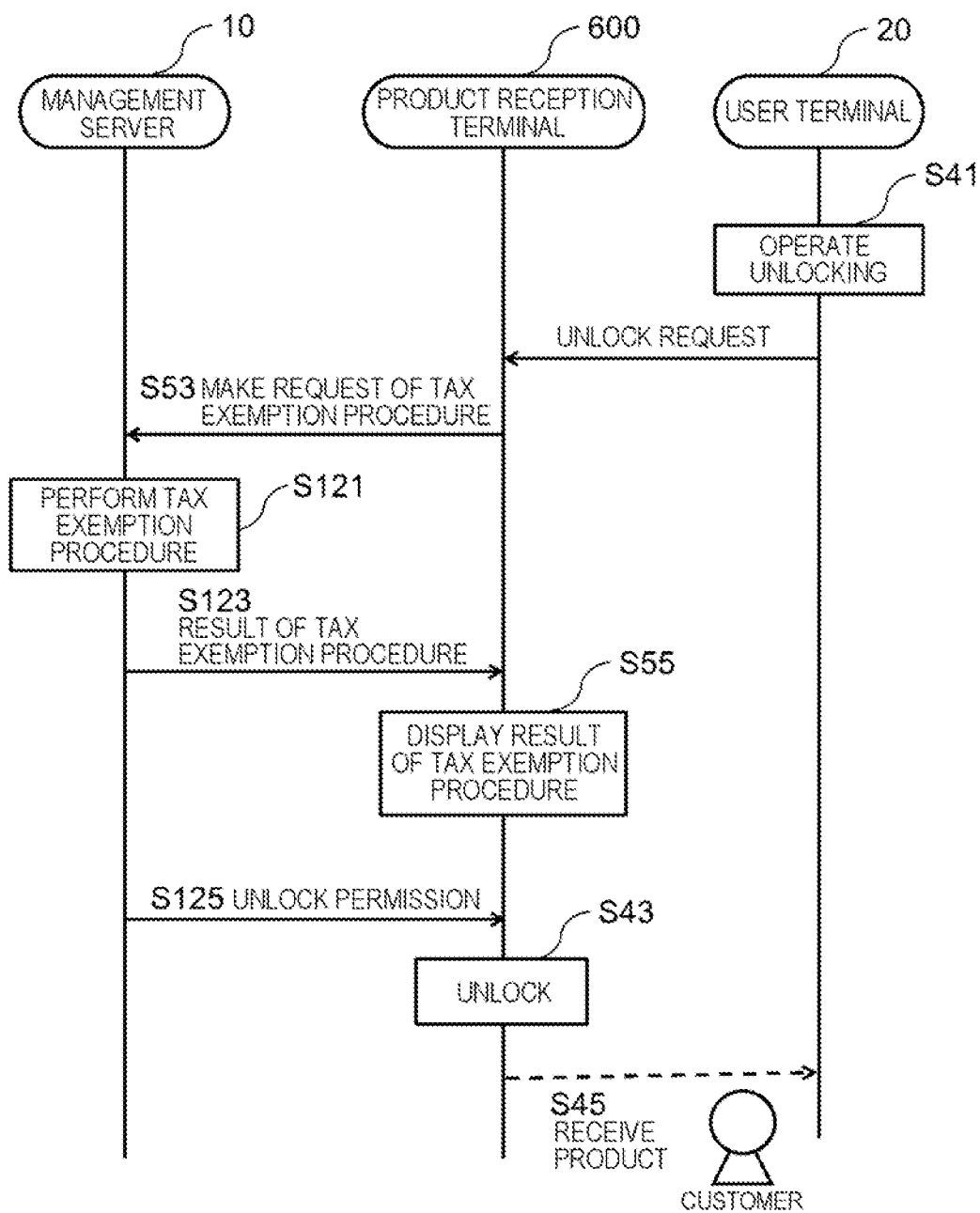
FIG. 19 It is a flowchart illustrating an operation example of a tax exemption procedure.

FIG. 19 is a flowchart illustrating an operation example of a tax exemption procedure.

First, the user terminal 20 is caused to display a QR code including a product receipt request, and a code scanner of the product reception terminal 600 is caused to read the QR code (step S41). This processing is the same as an unlocking request in FIG. 14. In the present example embodiment, between steps S41 and S43 of FIG. 14, processing relating to tax exemption relating to a purchase product of a customer is executed. First, when receiving an unlocking request from the user terminal 20, the product reception terminal 600 requests the management server 10 to execute processing relating to tax exemption relating to for the purchase product of the customer (step S53).

The tax exemption processing unit 120 of the management server 10 executes a tax exemption procedure (step S121). Specifically, the tax exemption processing unit 120 refers to the tax exemption history information 450, confirms a tax exemption history of a customer, adds a total of prices of currently purchase products to a total amount already purchased in a current trip, and determines whether an upper limit of tax exemption exceeds. When the upper limit exceeds, a product of a taxation target is distinguished from a product of a tax exemption target, and a tax exempted amount is computed.

The tax exemption processing unit 120 transmits a result of the tax exemption procedure to the product reception terminal 600 (step S123). The result of the tax exemption procedure is displayed on the display of the product reception terminal 600 (step S55). Alternatively, the tax exemption processing unit 120 may transmit the result of the tax exemption procedure to the user terminal 20. Alternatively, a configuration may be adopted in which the result of the tax exemption procedure can be viewed on a user-dedicated web page of a customer. The result of the tax exemption procedure includes product information targeted for tax exemption (a product name, a quantity, and a price and a total amount) and a tax exempted amount and, when there is a product targeted for taxation, the product information (a product name, a quantity, and a price and a total value). Moreover, a payment method of refund money may also be displayed.

Then, the tax exemption processing unit 120 permits the product reception terminal 600 to unlock a locker in which the product of the customer is kept (step S125). In response to the unlocking permission from the management server 10, the product reception terminal 600 acquires, from the QR code read in step S41, a position of the locker to be unlocked and unlocking information, and unlocks the locker at the acquired position by use of the unlocking information (step S43). The customer takes out and receives the product from the unlocked locker (step S45).

In this way, the customer can receive the product after the tax exemption procedure.

Moreover, a configuration may be such that the information processing apparatus 100 according to the present example embodiment does not include the transmitting unit 110, and a clerk in charge performs delivery of a product. Similarly, after the display of the product reception terminal 600 is caused to display a result of performing the tax exemption procedure (step S55), the clerk in charge may hand over the product to the customer.

According to the present example embodiment, an advantageous effect similar to that according to the first example embodiment is provided, and, further, since the tax exemption processing unit 120 executes processing relating to tax exemption of a product before a customer passes through a boarding gate, a proper tax exemption procedure can be efficiently performed for a purchase product.

Fourth Example Embodiment

The present example embodiment is the same as any of the example embodiments described above, except for including a configuration in which a term of being capable of receiving an order for product purchase is set. FIG. 20 is a functional block diagram logically illustrating a configuration of an information processing apparatus 100 according to the fourth example embodiment.

The information processing apparatus 100 in FIG. 20 further includes a flight information acquisition unit 140 in addition to the configuration of the information processing apparatus 100 in FIG. 4. Moreover, a virtual store system 1 according to the present example embodiment includes a configuration illustrated in FIG. 12. However, the virtual store system 1 and the information processing apparatus 100 according to the present example embodiment may be combined with at least one of the configurations according to other example embodiments within a range that does not cause contradiction.

Functional Configuration Example

The flight information acquisition unit 140 acquires information indicating a boarding target of a customer. According to a boarding target, a reception available term of an order is set.

An order reception unit 104 receives an order from a customer when it is within the reception available term.

An order reception available term is set in consideration of a time from reception of an order to preparation of a product and delivery thereof to a customer. That is to say, in an example according to the present example embodiment, a term is set in consideration of an allowed time in which a store receives an order, prepares a product, and transports the product to a delivery place of the product, and a customer goes to the delivery place, and receives the product, and can pass through the boarding gate 15 minutes before a departure time of a flight. Thus, it is preferable that a term is set according to a layout, a distance, and the like of a store, a product delivery place, a boarding gate, and the like.

Figure 21A:
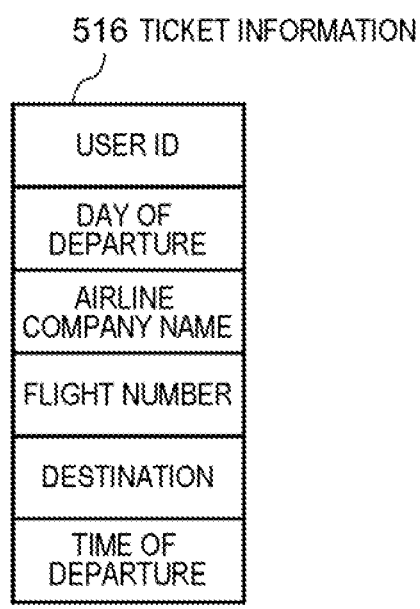
FIGS. 21A and 21B They are diagrams respectively illustrating data structures example of ticket information of a customer and flight time information of an airplane.
Figure 21B:
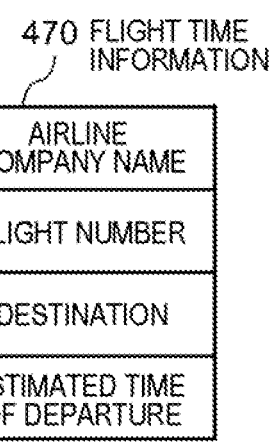

FIGS. 21A and 21B are diagrams each illustrating a data structure example of ticket information 516 of a customer and airplane flight time information 470 of an airplane. The ticket information 516 in FIG. 21A includes, for example, a user ID of a customer, a departure date, an airline name, a flight number, a destination, and a departure time. For the ticket information 516, a check-in terminal 520 acquires ticket information of a customer when a customer checks in, and the ticket information can be stored in an authentication information storage unit 510. It is assumed that the flight time information 470 in FIG. 21B indicates information on the actual departure time of a day of a flight scheduled to depart from an airport, and, for example, when a delay occurs in the departure time, the departure time is updated to an actual departure time. The flight time information 470 includes, for example, an airline name, a flight number, a destination, and an actual scheduled departure time.

The reception available term of an order set according to a boarding target is, for example, 30 minutes before a scheduled departure time of a flight of a boarding target of a customer.

Figure 22:
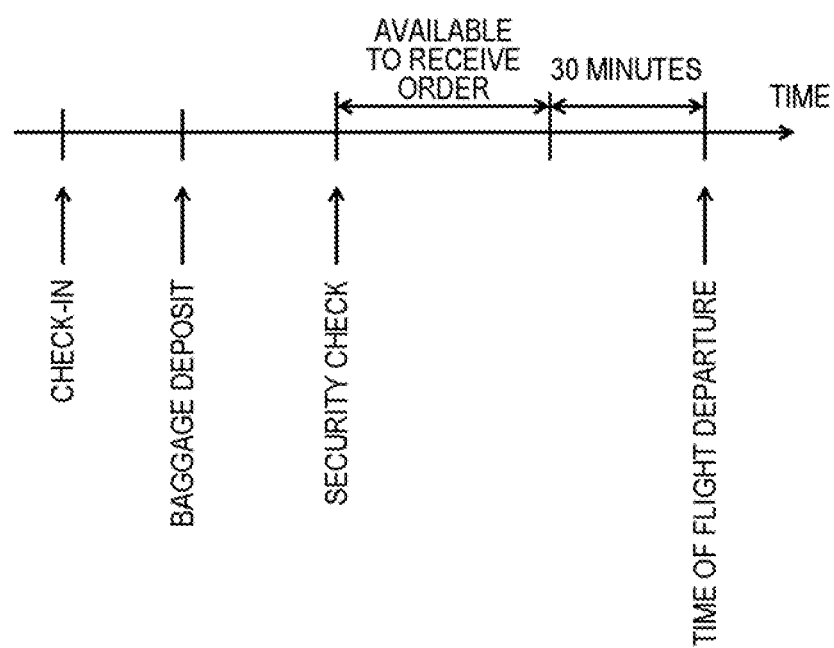
FIG. 22 It is a diagram for describing an order reception available term.

FIG. 22 is a diagram for describing the order reception available term. At the airport, the customer first completes check-in, deposits baggage, and then undergoes a security check. Order reception becomes possible during a time 30 minutes before a departure time of a flight that a customer is scheduled to board after passage through the security checkpoint gate 540.

Operation Example

Figure 23:
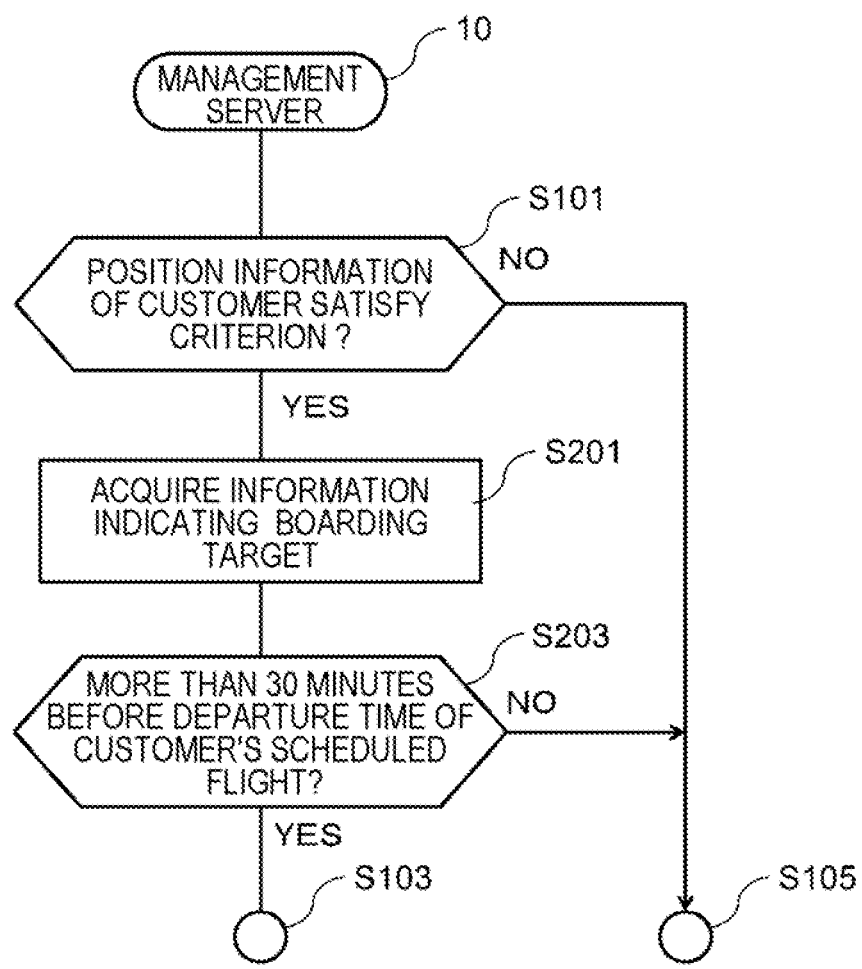
FIG. 23 It is a flowchart illustrating an operation example of a management server.

FIG. 23 is a flowchart illustrating an operation example of a management server 10 (the information processing apparatus 100). After position information of a customer satisfies a criterion in step S101 of the flowchart of FIG. 10 described in the first example embodiment (YES in step S101), processing proceeds to the present processing. The flight information acquisition unit 140 requests the authentication server 500 for the ticket information 516 of the customer acquired by the check-in terminal 520 and acquires the authentication server 500 (step S201). Specifically, the authentication server 500 reads, from the authentication information storage unit 510, the ticket information 516 of a user ID being associated with a customer ID of the customer inquired from the flight information acquisition unit 140, and transmits the ticket information 516 to the management server 10.

The order reception unit 104 reads, from the flight time information 470, a scheduled departure time of a flight that a customer is scheduled to board from the acquired ticket information 516, sets an orderable term (30 minutes before a departure time), and determines that a current time is before the orderable term (step S203). When a current time is before the orderable term (YES in step S203), order reception processing is performed (step S103 in FIG. 10). When a current time is over the orderable term (NO in step S203), an order cannot be received, and, therefore, a virtual store web server 30 is instructed to perform cancel processing of the order (step S105 in FIG. 10). Then, the virtual store web server 30 performs cancel processing of the order for the product put in a cart, and notifies a user terminal 20 thereof (step S27 in FIG. 10).

Note that, when a departure time of a flight that the customer is scheduled to board is delayed, the flight time information 470 is updated to the delayed departure time, and, therefore, the order reception unit 104 changes the orderable term according to a departure time, and performs determination processing in step S203.

According to the present example embodiment, an advantageous effect similar to that according to any of the example embodiments is provided, and, further, since the flight information acquisition unit 140 acquires information indicating a boarding target of a customer, and the reception available term of an order is set according to a boarding target, the order reception available term can be set in consideration of a departure time of a flight that a customer is scheduled to board. Moreover, a delay of a flight can also be dealt with.

Fifth Example Embodiment

In the example embodiment described above, a configuration that enables product purchase at a virtual store of a duty-free store or the like at an airport before embarkation has been described. The present example embodiment describes, as another example, a configuration that enables, when a cruise ship temporarily makes a port call at a bay, a customer to disembark from the cruise ship and perform product purchase at a virtual store of a duty-free store temporarily set up at the bay.

Since an information processing apparatus 100 according to the present example embodiment includes a configuration of the information processing apparatus 100 (FIG. 16) according to the third example embodiment including a configuration that executes processing relating to tax exemption of a purchase product, description is given by use of FIG. 16. Moreover, a virtual store system 1 is described by use of FIG. 12.

FIG. 24 is a diagram illustrating a method for a customer to utilize a virtual store at a temporary port call of a cruise ship. First, when a customer disembarks, an authentication terminal 50 performs authentication processing of the customer, and stores an authentication result in authentication result information 514 in FIG. 5B. In this instance, the authentication terminal 50 may also acquire passport information of the customer. An acquisition method of passport information is similar to the method described in the third example embodiment. When the customer embarks, the authentication terminal 50 further performs authentication processing of the customer, and stores an authentication result in the authentication result information 514 in FIG. 5B.

Then, the customer activates the application on the user terminal 20 while disembarking, logs in to a virtual store website 40, and performs browsing. In the present example embodiment, a criterion used by an order reception unit 104 for determination is a position of the authentication terminal 50 that performs authentication processing at disembarkation. Then, for a virtual store, a temporarily opened virtual store of a duty-free store is set. Note that, in this example, since opening of a store is for a limited period, a virtual store is set by further specifying a period.

Moreover, the order reception unit 104 receives an order by the customer during a time in which the customer passes through a first gate (an installation place of the authentication terminal 50 at disembarkation) and then until passing through the second gate (an installation place of the authentication terminal 50 at embarkation).

Order reception processing of a product is a procedure similar to that in FIG. 10 described in the example embodiment described above. Then, in a procedure similar to that in FIG. 14, the product is transported to a product keeping locker 610, unlocking information is transmitted from a management server 10 to the user terminal 20 of the customer (step S115), and then the order reception processing proceeds to a tax exemption procedure in FIG. 19. A product reception terminal 600 installed at a place of the product keeping locker 610 is caused to read a QR code displayed on the user terminal 20 (step S41).

Accordingly, the product reception terminal 600 requests the management server 10 for execution of processing relating to tax exemption relating to a purchase product by the customer (step S53). A tax exemption processing unit 120 of the management server 10 executes a tax exemption procedure (step S121). The tax exemption processing unit 120 transmits a result of the tax exemption procedure to the product reception terminal 600 (step S123). The result of the tax exemption procedure is displayed on a display of the product reception terminal 600 (step S55).

The tax exemption processing unit 120 permits the product reception terminal 600 to unlock a locker in which a product of the customer is kept (step S125). In response to the unlocking permission from the management server 10, the product reception terminal 600 acquires, from the QR code read in step S41, a position of the locker to be unlocked and unlocking information, and unlocks the locker at the acquired position by use of the unlocking information (step S43). The customer takes out the product from the unlocked locker, and receives the product (step S45).

In this way, the customer can receive the product after the tax exemption procedure.

According to the present example embodiment, since a virtual store can accept shopping at a specially established duty-free store in such a case that a cruise ship temporarily makes a port call at a bay, product purchase of the customer can be efficiently accepted, and sales can be promoted, while congestion in the duty-free store is eased.

Sixth Example Embodiment

Figure 25:
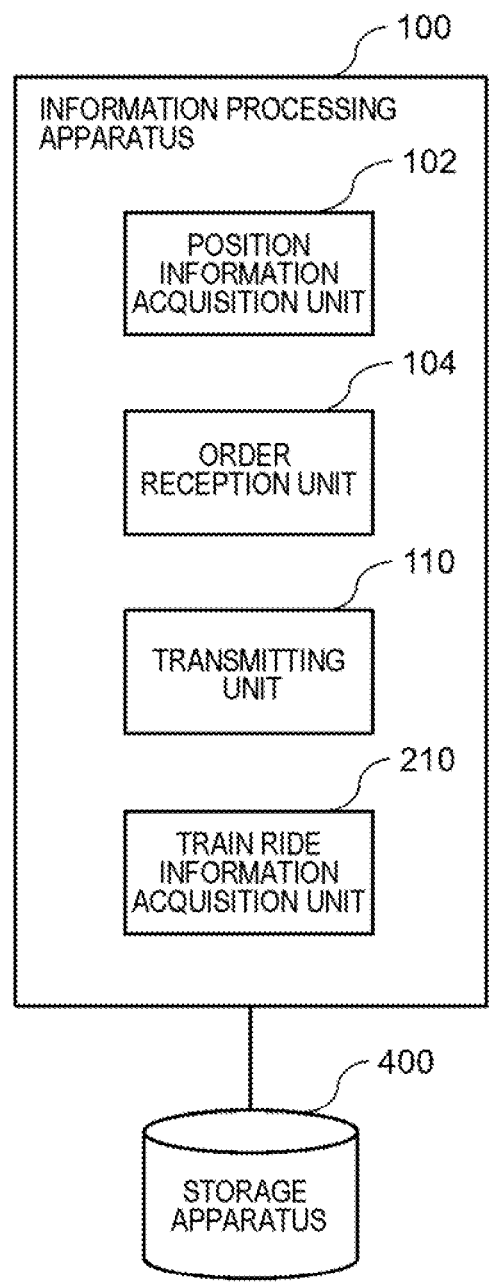
FIG. 25 It is a functional block diagram logically illustrating a configuration of the information processing apparatus according to the example embodiment.

In the present example embodiment, as still another example, a configuration that enables product purchase in a virtual store of a souvenir store, a stall, or the like at utilization of a railway such as a Shinkansen is described. FIG. 25 is a functional block diagram logically illustrating a configuration of an information processing apparatus 100 according to the present example embodiment. The information processing apparatus 100 according to the present example embodiment further includes a train ride information acquisition unit 210 in the configuration of the information processing apparatus 100 (FIG. 13) according to the second example embodiment having a configuration that receives a product by use of a product keeping locker 610. Moreover, the virtual store system 1 is described by use of FIG. 12.

The train ride information acquisition unit 210 acquires identification information of a customer who rides public transportation, and information indicating a riding target of the customer. The acquired information may be stored as ticket information 516.

The reception available term of an order is set according to a riding target.

The order reception unit 104 receives an order by a customer when it is within the reception available term.

FIG. 26 is a diagram for describing a method of utilizing a virtual store while riding a Shinkansen. First, when a customer purchases a ticket with a ticket purchase terminal 710, an authentication terminal 50 performs authentication processing of the customer, and stores an authentication result in an authentication result information 514 in FIG. 5B. Note that, a ticket may not be purchased with the ticket purchase terminal 710, but may be purchased at a ticket purchase site or the like. Further, when the customer passes through the entrance ticket gate 720, the authentication terminal 50 provided at an entrance ticket gate 720 performs authentication processing of the customer, and stores an authentication result in the authentication result information 514 in FIG. 5B.

Information indicating a riding target of the customer includes a route name (e.g., Tokaido Shinkansen), a train name (e.g., Nozomi No. 7), a destination (e.g., Hakata), a departure station (e.g., Tokyo Station), a departure time (e.g., 6:51), a getting-off station (e.g., Shin-Osaka), an arrival time (e.g., 9:21), and the like.

Various methods of acquiring, by the train ride information acquisition unit 210, the ticket information 516 of a train that a customer is scheduled to ride can be conceived.
  (1) A customer ID is linked with information of a ticket purchased by logging in to a ticket purchase site.
  (2) A face image of a customer is captured at the entrance ticket gate 720 by use of a camera 60, and feature information of the face image and information of a ticket read at the entrance ticket gate 720 are associated and stored.
  (3) The ID information read from a transportation IC card at the entrance ticket gate 720 and information of a ticket are associated and stored.

A customer previously registers at least one of the pieces of information (1) to (3) described above at utilization registration of the virtual store system 1. The train ride information acquisition unit 210 can determine a customer by collating information (e.g., a user ID in a ticket purchase site, face feature information, or ID information of a transportation IC card) for determining the customer acquired together with the acquired ticket information 516, and associate customer with the ticket information 516.

The acquired ticket information 516 is used, for example, in order to set the order reception available term of a product and a leaving term from a predetermined region described in the above example embodiment.

Then, the customer activates an application on a user terminal 20, logs in to a virtual store website 40, and performs browsing. In the present example embodiment, while a plurality of criteria used for determination by the order reception unit 104 are set, one is a position of the entrance ticket gate 720. Herein, description is given assuming a case where a customer rides a limited express train departing from an A station and arriving at a B station. In this case, for example, a customer can order a product in a virtual store of a souvenir store or a stall at the A station, and hand over the product to the customer by delivering the product from a physical store at the A station before the train departs at the A station. Further, a customer orders a product in a virtual store of a souvenir store or a stall at station B where the customer will get off a train, and, when the train arrives at the B station, the product can be delivered from a physical store at the B station and handed over to the customer.

Further, a customer can order a product in a virtual store of a souvenir store or a stall at each station where a limited express train will stop on the way, and the product can be delivered from a physical store at each station and handed over to the customer before the train stops at each station. Moreover, a customer may order a product in a virtual store of a souvenir store or a stall being an original of a train or a railway brand, being a local specialty, or being common to a specific campaign, and the product may be delivered from a physical store at any station where the train will stop, and handed over to the customer.

Note that, a product purchased in a virtual store at the A station at departure may be received in a product delivery place at the A station, or may be received in a product delivery place at the B station at getting off. A configuration may be such that a customer can select a receiving place of a product. A receivable place may be previously determined depending on a product.

Figure 27:
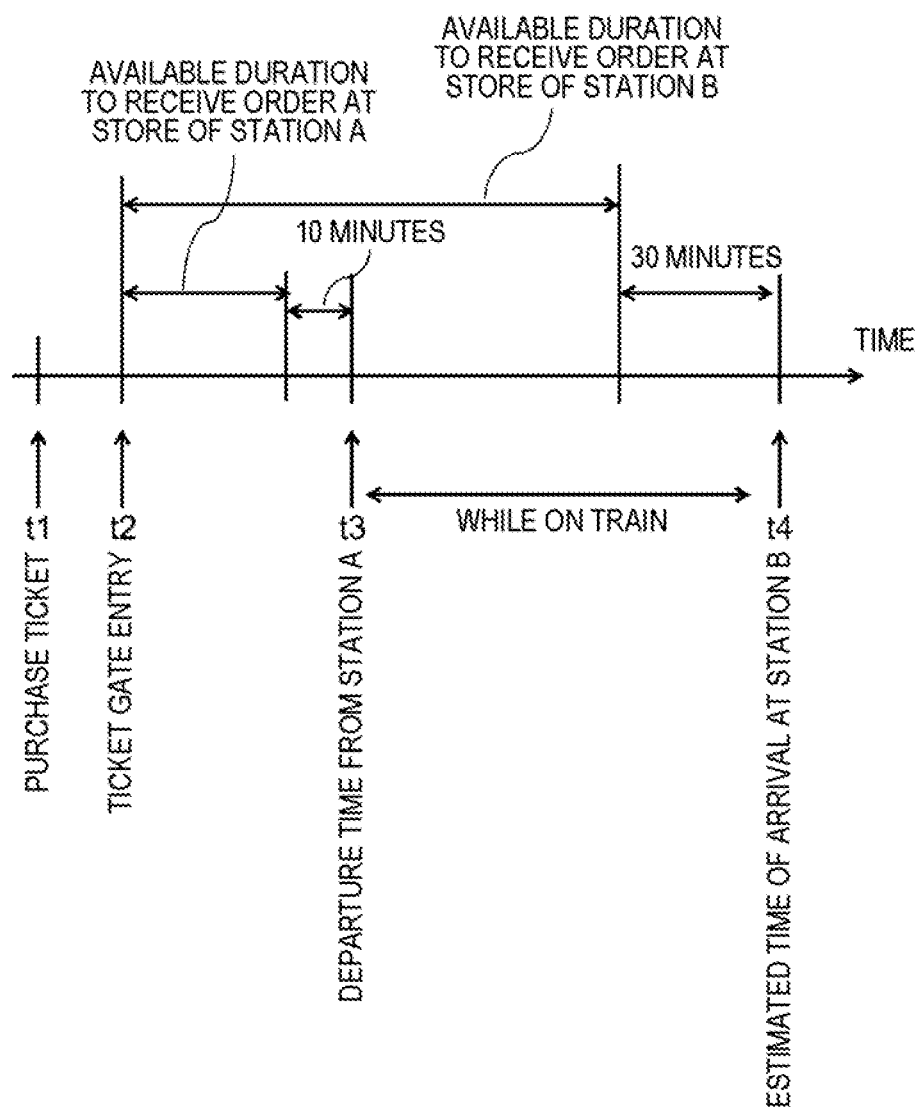
FIG. 27 It is a diagram for describing an order reception available period.

FIG. 27 is a diagram for describing the order reception available period.

First, the order reception unit 104 receives an order in a virtual store at the A station during a time (A station store order reception available period) until a predetermined time before (in this example, 10 minutes before) a departure time t3 of a train that a customer is scheduled to ride from the A station after passing through the entrance ticket gate 720 (time t2). The predetermined time may be changed according to an extent of a station premise, an installation place of the product keeping locker 610, or the like. Further, the order reception unit 104 receives an order in a virtual store at the B station during a time (B station store order reception available period) until a second predetermined time before (in this example, 30 minutes before) a scheduled B station arrival time t4 at which a customer is scheduled to get off after passing through the entrance ticket gate 720 (time t2). The second predetermined time may also be changed according to an extent of a station premise, an installation place of the product keeping locker 610, or the like.

Since order reception processing of a product and processing of product delivery are similar to those according to any of the example embodiments described above, detailed description thereof is not included.

According to the present example embodiment, even when public transportation such as a railway is utilized, an advantageous effect similar to that according to any of the example embodiments described above can be provided.

Seventh Example Embodiment

In the present example embodiment, as yet another example, a configuration that enables product purchase in a virtual store of a souvenir store, a stall, or the like in a bus terminal, a parking area, or the like at utilization of a long-distance bus such as an expressway bus or a sightseeing bus is described. An information processing apparatus 100 according to the present example embodiment is similar to the information processing apparatus 100 according to the sixth example embodiment in FIG. 25, and is therefore described by use of FIG. 25. A virtual store system 1 is described by use of FIG. 12.

For an expressway bus, for example, an order for a product in a virtual store of a souvenir store or a stall in a bus terminal can be made before riding. By a method similar to that according to the sixth example embodiment, a train ride information acquisition unit 210 acquires identification information of a customer riding public transportation and information indicating a riding target of the customer.

Similarly to a time of train utilization in FIG. 27, entrance ticket examination of a ticket for a bus is performed by use of an authentication terminal 50, the order reception unit 104 receives an order in a virtual store of a souvenir store or a stall in a departure bus terminal during a time until a predetermined time before (e.g., 10 minutes before) a departure time t3 of the bus from a time when entrance of a customer is detected (time t2). Moreover, the order reception unit 104 receives an order in a virtual store of a souvenir store or a stall in a getting-off bus terminal during a time until a second predetermined time before (e.g., 30 minutes before) a scheduled bus terminal arrival time t4 scheduled for getting off from a time when entrance of a customer is detected (time t2).

Moreover, the order reception unit 104 may receive an order in a virtual store of a souvenir store or a stall in a parking area where a stop is made on the way, in addition to a departure and arrival bus terminal. In this case, it is necessary to temporarily stop by a parking area, and previously set a scheduled time for departing from the parking area. The order reception unit 104 receives an order in a virtual store of a souvenir store or a stall in a parking area during a time until a third predetermined time before (e.g., 20 minutes before) a scheduled time for departing from the parking area from a time when entrance of a customer is detected (time t2).

A product purchased in a virtual store at a bus terminal at departure may be received in a product delivery place at a bus terminal at getting off, or may be received in a product delivery place at a bus terminal at getting off. A configuration may be such that a customer can select a receiving place of a product. A receivable place may be previously determined depending on a product.

A product purchased in a virtual store in a parking area may be received in a product delivery place in the parking area, or may be received in a product delivery place at a bus terminal at getting off. A configuration may be such that a customer can select a receiving place of a product. A receivable place may be previously determined depending on a product.

According to the present example embodiment, even when a long-distance bus or the like is utilized, an advantageous effect similar to that according to any of the example embodiments described above can be provided.

The example embodiments of the present invention have been described above with reference to the drawings, but are exemplifications of the present invention, and various configurations other than those described above can also be adopted.

For example, authentication processing of a customer may be combined with liveness authentication for confirming that the customer is actually there.

While the invention of the present application has been described above with reference to the example embodiments and examples, the invention of the present application is not limited to the example embodiments and examples described above. Various modifications understandable to a person skilled in the art can be made to a configuration and details of the invention of the present application within the scope of the invention of the present application.

Note that, when information relating to a user is acquired and utilized in the present invention, the acquisition and utilization are to be performed legally.

Some or all of the above-described example embodiments can also be described as, but are not limited to, the following supplementary notes.

1. An information processing apparatus including:
    a position information acquisition unit that acquires position information of a customer; and
    an order reception unit that receives an order for product purchase by the customer at a virtual store, when the position information satisfies a criterion.
2. The information processing apparatus according to supplementary note 1, wherein
    a plurality of the criteria are set, and the virtual store being capable of receiving an order is set for each of the criteria.
3. The information processing apparatus according to supplementary note 1 or 2, wherein
    the order reception unit
        receives the order by the customer during a time in which the customer passes through a first gate and then passes through a second gate.
4. The information processing apparatus according to supplementary note 3, wherein
    the second gate is a boarding gate at an airport,
    the information processing apparatus further including a flight information acquisition unit that acquires information indicating a boarding target of the customer, wherein
    a reception available term of the order is set according to the boarding target, and
    the order reception unit receives an order by the customer when it is within the reception available term.
5. The information processing apparatus according to supplementary note 3 or 4, wherein
    the second gate is a boarding gate of an airport,
    the information processing apparatus further including an executing unit that executes processing relating to tax exemption of the product for which an order has been received by the order reception unit, wherein
the executing unit executes the processing after the customer has finished a departure inspection and until before passing through the boarding gate.
6. The information processing apparatus according to supplementary note 3, further including
a train ride information acquisition unit that acquires identification information of a customer who rides public transportation, and information indicating a riding target of the customer, wherein
a reception available term of the order is set according to the boarding target, and
the order reception unit receives an order by the customer when it is within the reception available term.
7. The information processing apparatus according to any one of supplementary notes 1 to 6, further including
a transmitting unit that transmits, to a terminal of the customer, information necessary for receiving the product, after purchase processing is performed according to the order received by the order reception unit and then the product is moved to a product delivery place.
8. The information processing apparatus according to supplementary note 7, wherein
the product delivery place is a locker, and
the information necessary for receiving the product includes unlocking information of the locker.
9. The information processing apparatus according to supplementary note 8, wherein
a leaving term of the customer from a predetermined region is set, and
the information processing apparatus further including a second transmitting unit that transmitting, when the locker is not unlocked by the leaving term, information indicating this to a management terminal.
10. An information processing method including,
by an information processing apparatus:
acquiring position information of a customer; and
receiving an order for product purchase by the customer at a virtual store, when the position information satisfies a criterion.
11. The information processing method according to supplementary note 10, wherein
a plurality of the criteria are set, and the virtual store being capable of receiving an order is set for each of the criteria.
12. The information processing method according to supplementary note 10 or 11, further including,
by the information processing apparatus,
receiving the order by the customer during a time in which the customer passes through a first gate and then passes through a second gate.
13. The information processing method according to supplementary note 12, wherein
the second gate is a boarding gate at an airport,
the information processing method further including,
by the information processing apparatus,
acquiring information indicating a boarding target of the customer, wherein a reception available term of the order is set according to the boarding target,
the information processing method further including,
by the information processing apparatus,
receiving an order by the customer when it is within the reception available term.
14. The information processing method according to supplementary note 12 or 13, wherein
the second gate is a boarding gate of an airport,
the information processing method further including,
by the information processing apparatus,
executing processing relating to tax exemption of the product for which an order has been received, after the customer has finished a departure inspection and until before passing through the boarding gate.
15. The information processing method according to supplementary note 12, further including,
by the information processing apparatus,
acquiring identification information of a customer who rides public transportation, and information indicating a riding target of the customer, wherein
a reception available term of the order is set according to the boarding target,
by the information processing apparatus,
receiving an order by the customer when it is within the reception available term.
16. The information processing method according to any one of supplementary notes 10 to 15, further including
by the information processing apparatus,
transmitting, to a terminal of the customer, information necessary for receiving the product, after purchase processing is performed according to the order received and then the product is moved to a product delivery place.
17. The information processing method according to supplementary note 16, wherein
the product delivery place is a locker, and
the information necessary for receiving the product includes unlocking information of the locker.
18. The information processing method according to supplementary note 17, wherein
a leaving term of the customer from a predetermined region is set,
the information processing method further including,
by the information processing apparatus,
transmitting, when the locker is not unlocked by the leaving term, information indicating this to a management terminal.
19. A program for causing a computer to execute:
a procedure of acquiring position information of a customer; and
a procedure of receiving an order for product purchase by the customer at a virtual store, when the position information satisfies a criterion.
20. The program according to supplementary note 19, wherein
a plurality of the criteria are set, and the virtual store being capable of receiving an order is set for each of the criteria.
21. The program according to supplementary note 19 or 20, for causing a computer to execute
a procedure of receiving the order by the customer during a time in which the customer passes through a first gate and then passes through a second gate.
22. The program according to supplementary note 21, wherein
the second gate is a boarding gate at an airport,
the program causing a computer to execute
a procedure of acquiring information indicating a boarding target of the customer, wherein
a reception available term of the order is set according to the boarding target, the program causing a computer to execute a procedure of receiving an order by the customer when it is within the reception available term.

23. The program according to supplementary note 21 or 22, wherein
the second gate is a boarding gate of an airport,
the program causing a computer to execute
a procedure of executing processing relating to tax exemption of the product for which an order has been received, after the customer has finished a departure inspection and until before passing through the boarding gate.

24. The program according to supplementary note 21, causing a computer to execute
a procedure of acquiring identification information of a customer who rides public transportation, and information indicating a riding target of the customer, wherein
a reception available term of the order is set according to the boarding target,
the program causing a computer to execute
a procedure of receiving an order by the customer when it is within the reception available term.

25. The program according to any one of supplementary notes 19 to 24, causing a computer to execute
a procedure of transmitting, to a terminal of the customer, information necessary for receiving the product, after purchase processing is performed according to the received order and then the product is moved to a product delivery place.

26. The program according to supplementary note 25, wherein
the product delivery place is a locker, and
the information necessary for receiving the product includes unlocking information of the locker.

27. The program according to supplementary note 26, wherein
a leaving term of the customer from a predetermined region is set, and
the program causing a computer to execute
a procedure of transmitting, when the locker is not unlocked by the leaving term, information indicating this to a management terminal.

This application is based upon and claims the benefit of priority from Japanese patent application No. 2021-091801, filed on May 31, 2021, the disclosure of which is incorporated herein in its entirety by reference.

REFERENCE SIGNS LIST

1 Virtual store system
3a, 3b, 3c Communication network
10 Management server
20 User terminal
30 Virtual store web server
40 Virtual store website
50 Authentication terminal
60 Camera
70 Store terminal
100 Information processing apparatus
102 Position information acquisition unit
104 Order reception unit
110 Transmitting unit
120 Tax exemption processing unit
130 Notifying unit
140 Flight information acquisition unit
210 Train ride information acquisition unit
400 Storage apparatus
410 Customer information
412 Settlement means information
420 Position information
430 Order information
440 Transport information
450 Tax exemption history information
470 Flight time information
500 Authentication server
510 Authentication information storage unit
512 User authentication information
514 Authentication result information
516 Ticket information
520 Check-in terminal
530 Baggage reception terminal
540 Security checkpoint gate
550 Boarding gate
600 Product reception terminal
610 Product keeping locker
720 Entrance ticket gate
1000 Computer
1010 Bus
1020 Processor
1030 Memory
1040 Storage device
1050 Input/output interface
1060 Network interface

What is claimed is:

1. An information processing apparatus comprising:
at least one memory configured to store instructions; and
at least one processor configured to execute the instructions to:
acquire position information of a customer from a first authentication terminal and a second authentication terminal based on a successful result of biometric authentication of the customer using an image acquired by capturing an image of the customer with a camera of the first authentication terminal and a camera of the second authentication terminal installed at the respective locations of a first gate through which a customer passes when entering a specified area and a second gate through which the customer passes when exiting the specified area, the position information of the customer acquired from the first authentication terminal indicating that the customer has passed through the first gate, and the position information of the customer acquired from the second authentication terminal indicating that the customer has passed through the second gate; and
receive, in a case where the position information of the customer indicates that the customer is in a predetermined area, an order for product purchase by the customer at a virtual store.

2. The information processing apparatus according to claim 1, wherein
a plurality of criteria are set, and the virtual store being capable of receiving an order is set for each of the plurality of criteria.

3. The information processing apparatus according to claim 1, wherein
the second gate is a boarding gate at an airport, and
the at least one processor is further configured to execute the instructions to acquire information indicating a boarding target of the customer, wherein a reception available term of the order is set according to the boarding target, and the at least one processor is further configured to execute the instructions to receive the by the customer when it is within the reception available term.

4. The information processing apparatus according to claim 1, wherein the second gate is a boarding gate of an airport, and the at least one processor is further configured to execute the instructions to:

execute processing relating to tax exemption of the product for which an order has been received by an order reception unit; and execute the processing after the customer has finished a departure inspection and until before passing through the boarding gate.

5. The information processing apparatus according to claim 1, wherein the at least one processor is further configured to execute the instructions to transmit, to a terminal of the customer, information necessary for receiving the product, after purchase processing is performed according to the order received by an order reception unit and then the product is moved to a product delivery place.

6. The information processing apparatus according to claim 5, wherein the product delivery place is a locker, and the information necessary for receiving the product includes unlocking information of the locker.

7. The information processing apparatus according to claim 6, wherein a leaving term of the customer from a predetermined region is set, and the at least one processor is further configured to execute the instructions to transmit, when the locker is not unlocked by the leaving term, information indicating this to a management terminal.

8. The information processing apparatus according to claim 1, wherein the settlement processing is performed using a settlement procedure associated with the customer and registered in advance.

9. An information processing method comprising, by an information processing apparatus:

acquiring position information of a customer from a first authentication terminal and a second authentication terminal based on a successful result of biometric authentication of the customer using an image acquired by capturing an image of the customer with a camera of the first authentication terminal and a camera of the second authentication terminal installed at the respective locations of a first gate through which a customer passes when entering a specified area and a second gate through which the customer passes when exiting the specified area, the position information of the customer acquired from the first authentication terminal indicating that the customer has passed through the first gate, and the position information of the customer acquired from the second authentication terminal indicating that the customer has passed through the second gate; and receiving, in a case where the position information of the customer indicates that the customer is in a predetermined area, an order for product purchase by the customer at a virtual store.

10. A non-transitory computer-readable storage medium storing a program for causing a computer to execute:

a procedure of acquiring position information of a customer from a first authentication terminal and a second authentication terminal based on a successful result of biometric authentication of the customer using an image acquired by capturing an image of the customer with a camera of the first authentication terminal and a camera of the second authentication terminal installed at the respective locations of a first gate through which a customer passes when entering a specified area and a second gate through which the customer passes when exiting the specified area, the position information of the customer acquired from the first authentication terminal indicating that the customer has passed through the first gate, and the position information of the customer acquired from the second authentication terminal indicating that the customer has passed through the second gate; and a procedure of receiving, in a case where the position information of the customer indicates that the customer is in a predetermined area, an order for product purchase by the customer at a virtual store.

11. The information processing method according to claim 9, wherein further including, by the information processing apparatus, receiving the order by the customer during a time in which the customer passes through a first gate and then passes through a second gate.

12. The information processing method according to claim 11, wherein the second gate is a boarding gate at an airport, the method further comprising, by the information processing apparatus, acquiring information indicating a boarding target of the customer, wherein a reception available term of the order is set according to the boarding target, and the method further comprising, by the information processing apparatus, receiving the order by the customer when it is within the reception available term.

13. The information processing method according to claim 11, wherein the second gate is a boarding gate of an airport, and the method further comprising, by the information processing apparatus:

executing processing relating to tax exemption of the product for which an order has been received; after the customer has finished a departure inspection and until before passing through the boarding gate.

14. The information processing method according to claim 9, wherein a plurality of criteria are set, and the virtual store being capable of receiving an order is set for each of the plurality of criteria.

15. The non-transitory computer-readable storage medium according to claim 10, wherein a plurality of criteria are set, and the virtual store being capable of receiving an order is set for each of the plurality of criteria.

16. The non-transitory computer-readable storage medium according to claim 10, wherein the program causes the computer to execute a procedure of receiving, during a time in which the customer passes through a first gate and then passes through a second gate, the order by the customer.

17. The non-transitory computer-readable storage medium according to claim 16, wherein the second gate is a boarding gate at an airport, and the program causes the computer to execute a procedure of acquiring information indicating a boarding target of the customer, wherein
a reception available term of the order is set according to the boarding target, and
the program causes the computer to execute a procedure of receiving the order by the customer when it is within the reception available term.

18. The non-transitory computer-readable storage medium according to claim 16, wherein
the second gate is a boarding gate of an airport, and
the program causes the computer to execute
a procedure of executing processing relating to tax exemption of the product for which an order has been received, after the customer has finished a departure inspection and until before passing through the boarding gate.

* * * * *